US012199516B2

(12) United States Patent
Liu et al.

(10) Patent No.: US 12,199,516 B2
(45) Date of Patent: *Jan. 14, 2025

(54) MULTI-PHASE SWITCHING CONVERTER AND CONTROL METHOD THEREOF

(71) Applicant: Richtek Technology Corporation, Zhubei (TW)

(72) Inventors: Kuo-Chi Liu, Hsinchu (TW); Ta-Yung Yang, Taoyuan (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,261

(22) Filed: Oct. 13, 2023

(65) Prior Publication Data

US 2024/0235370 A1  Jul. 11, 2024

Related U.S. Application Data

(60) Provisional application No. 63/480,023, filed on Jan. 16, 2023, provisional application No. 63/479,360, filed on Jan. 11, 2023.

(30) Foreign Application Priority Data

Jul. 6, 2023  (TW) .................................. 112125206

(51) Int. Cl.
*H02M 3/158* (2006.01)
*H02M 1/088* (2006.01)
(Continued)

(52) U.S. Cl.
CPC ......... *H02M 3/1584* (2013.01); *H02M 1/088* (2013.01); *H02M 3/07* (2013.01);
(Continued)

(58) Field of Classification Search
CPC ...... H02M 3/07; H02M 1/0009; H02M 3/015; H02M 1/0095; H02M 1/10; H02M 1/0058;
(Continued)

(56) References Cited

U.S. PATENT DOCUMENTS 8,351,228 B2 *  1/2013  Izumi .................... H02M 3/07
363/60
9,667,139 B2 *  5/2017  Giuliano ............... H02M 3/158
(Continued)

*Primary Examiner* — Yusef A Ahmed
(74) *Attorney, Agent, or Firm* — Tung & Associates

(57) ABSTRACT

A multi-phase switching converter, includes: plural sub-switching converters; and a control circuit. Plural switching signals operate a capacitor of one of the plural sub-switching converters and a capacitor of another one of the plural sub-switching converters, to conduct a switched capacitor switching on a first voltage, thus switching an inductor switching node in each sub-switching converter between a divided voltage of the first voltage and a reference potential and to thereby execute a power conversion between the first voltage and a second voltage. When the inductors of each of the plural sub-switching converters are coupled with one another in a non-electromagnetic fashion, the multi-phase switching converters operate in a non-resonant mode. When the inductors of at least two of the plural sub-switching converters are electromagnetically coupled with one another, the multi-phase switching converters operate in a resonant mode or in the non-resonant mode.

20 Claims, 12 Drawing Sheets

(51) Int. Cl.
  *H02M 3/07* (2006.01)
  *H02M 1/00* (2006.01)
  *H02M 3/00* (2006.01)
(52) U.S. Cl.
  CPC ........ *H02M 3/1586* (2021.05); *H02M 1/0095* (2021.05); *H02M 3/01* (2021.05)
(58) Field of Classification Search
  CPC .... H02M 3/158; H02M 3/1584; H02M 1/088; H02M 3/1586; H02M 3/01; Y02B 70/10
  See application file for complete search history.

(56) References Cited

U.S. PATENT DOCUMENTS

| | | | |
|---|---|---|---|
| 9,917,517 B1* | 3/2018 | Jiang | H02M 1/34 |
| 10,063,146 B1* | 8/2018 | Lee | G01R 19/003 |
| 10,651,731 B1* | 5/2020 | Rainer | H02M 3/1588 |
| 11,165,335 B2* | 11/2021 | Sblano | H02M 3/1584 |
| 2002/0054499 A1* | 5/2002 | Tanaka | H02M 7/4826 363/132 |
| 2004/0201281 A1* | 10/2004 | Ma | H02M 3/158 307/38 |
| 2011/0031951 A1* | 2/2011 | Chen | H02M 3/1582 323/288 |
| 2011/0175591 A1* | 7/2011 | Cuk | H02M 3/158 323/311 |
| 2012/0139522 A1* | 6/2012 | Hasegawa | H02M 1/32 323/311 |
| 2016/0181920 A1* | 6/2016 | Dai | H02M 1/14 323/271 |
| 2019/0028025 A1* | 1/2019 | Babazadeh | H01L 27/088 |
| 2019/0068061 A1 | 2/2019 | Jiang et al. | |
| 2020/0177081 A1* | 6/2020 | Huang | H02M 3/07 |
| 2020/0204071 A1* | 6/2020 | Huang | H02M 3/07 |
| 2021/0083582 A1* | 3/2021 | Bhattad | H02M 3/158 |
| 2021/0328507 A1* | 10/2021 | Liu | H02M 1/0095 |
| 2021/0351695 A1* | 11/2021 | Liu | H02M 3/155 |
| 2021/0367511 A1* | 11/2021 | Liu | H02M 3/01 |
| 2021/0367520 A1* | 11/2021 | Liu | H02M 3/158 |
| 2021/0376717 A1* | 12/2021 | Liu | H02M 3/01 |
| 2021/0384820 A1* | 12/2021 | Liu | H02M 1/007 |
| 2021/0399621 A1* | 12/2021 | Liu | H02M 3/01 |
| 2022/0029531 A1* | 1/2022 | Liu | H02M 3/01 |
| 2022/0103066 A1* | 3/2022 | Chen | H02M 3/04 |
| 2022/0140726 A1* | 5/2022 | Liu | H02M 1/0095 323/271 |
| 2022/0352816 A1* | 11/2022 | Liu | H02M 3/07 |
| 2022/0368218 A1* | 11/2022 | Liu | H02M 3/01 |
| 2023/0028873 A1* | 1/2023 | Liu | H02M 3/07 |
| 2023/0170795 A1* | 6/2023 | Yoo | H02M 1/08 323/271 |
| 2023/0179093 A1* | 6/2023 | Liu | H02M 1/0058 323/271 |
| 2023/0223843 A1* | 7/2023 | Liu | H02M 1/083 363/21.02 |
| 2023/0246548 A1* | 8/2023 | Liu | H02M 3/07 323/271 |
| 2023/0318460 A1* | 10/2023 | Cheng | H02M 1/0043 323/272 |
| 2023/0361674 A1* | 11/2023 | Liu | H02M 1/0009 |
| 2023/0396162 A1* | 12/2023 | Liu | H02M 1/0095 |
| 2023/0412073 A1* | 12/2023 | Ge | H02M 3/077 |
| 2024/0072633 A1* | 2/2024 | Liu | H02M 3/07 |
| 2024/0146188 A1* | 5/2024 | Pilawa-Podgurski | H02M 1/007 |
| 2024/0223086 A1* | 7/2024 | Liu | H02M 1/0058 |
| 2024/0297580 A1* | 9/2024 | Liu | H02M 3/07 |

* cited by examiner

MULTI-PHASE SWITCHING CONVERTER AND CONTROL METHOD THEREOF

CROSS REFERENCE

The present invention claims priority to the U.S. provisional patent application Ser. No. 63/479,360, filed on Jan. 11, 2023, and claims priority to the U.S. provisional patent application Ser. No. 63/480,023, filed on Jan. 16, 2023 and claims priority to the TW patent application Ser. No. 112125206, filed on Jul. 6, 2023, all of which foregoing mentioned provisional and nonprovisional patent applications are incorporated herein in their entirety by their reference.

BACKGROUND OF THE INVENTION

Field of Invention

The present invention relates to a multi-phase switching converter and a control method thereof; particularly, it relates to such multi-phase switching converter and such control method capable of achieving to adopt an inductor having a relatively smaller size.

Description of Related Art

Please refer to FIG. 1, which shows a schematic circuit diagram of a conventional dual-phase converter circuit. As shown in FIG. 1, the conventional dual-phase converter circuit 10 includes: two buck converter circuits 101a and 101b, both of which are coupled in parallel to each other, so as to extend an output current (not shown). The prior art shown in FIG. 1 has following drawbacks that: firstly, in order to withstand a maximum voltage level of an input voltage Vin, it is required for this conventional dual-phase converter circuit 10 to utilize switches Q1~Q4, each of which has an unwanted high rated voltage. Secondly, a voltage across an inductor L1 and a voltage across an inductor L2 are both extremely high, so it is required for each of the inductor L1 as well as the inductor L2 to undesirably have a relatively high inductance. Consequently and undesirably, each of the inductor L1 and the inductor L2 has a dramatically enormous size.

In view of the above, to overcome the drawbacks in the prior art, the present invention proposes a multi-phase switching converter and a control method capable of achieving to adopt an inductor having a relatively smaller size.

SUMMARY OF THE INVENTION

From one perspective, the present invention provides a multi-phase switching converter, which is configured to operably execute a power conversion between a first voltage at a first node and a second voltage at a second node; the multi-phase switching converter comprising: a plurality of sub-switching converters; and a control circuit, which is configured to operably generate a plurality of switching signals, so as to correspondingly control a plurality of corresponding switches of the plurality of corresponding sub-switching converters, thus periodically switching the plurality of the sub-switching converters between a plurality of corresponding electrical connection states and to thereby execute the power conversion between the first voltage at the first node and the second voltage at the second node; wherein each sub-switching converter includes: a capacitor, an inductor and a portion of the plurality of the switches, wherein the inductor has one end coupled to the second node, whereas, another end of the inductor and the capacitor are coupled to an inductor switching node in the each sub-switching converter where the corresponding inductor is located within this very each sub-switching converter; wherein between the plurality of electrical connection states, the plurality of the switching signals are configured to operably operate the capacitor of one of the plurality of the sub-switching converters and the capacitor of another one of the plurality of the sub-switching converters, so as to conduct a switched capacitor switching on the first voltage, thus switching the inductor switching node in the each sub-switching converter between a divided voltage of the first voltage and a reference potential and to thereby execute the power conversion between the first voltage and the second voltage; wherein when both/all of the inductors of the plurality of the sub-switching converters are coupled with one another in a non-electromagnetic fashion, the multi-phase switching converter operates in a nonresonant mode; wherein when the inductors of at least two of the plurality of the sub-switching converters are electromagnetically coupled with one another, the multi-phase switching converter operates in a resonant mode or the nonresonant mode.

From another perspective, the present invention provides a control method of a multi-phase switching converter; the control method comprising following steps: generating a plurality of switching signals, so as to correspondingly control a plurality of corresponding switches of a plurality of corresponding sub-switching converters in the multi-phase switching converter, thus periodically switching the plurality of the sub-switching converters between a plurality of corresponding electrical connection states and to thereby execute a power conversion between a first voltage at a first node and a second voltage at a second node, wherein each sub-switching converter includes: a capacitor, an inductor and a portion of the plurality of the switches, wherein the inductor has one end coupled to the second node, whereas, another end of the inductor and the capacitor are coupled to an inductor switching node in the each sub-switching converter where the corresponding inductor is located within this very each sub-switching converter; and between the plurality of electrical connection states, operating the capacitor of one of the plurality of the sub-switching converters and the capacitor of another one of the plurality of the sub-switching converters via the plurality of the corresponding switching signals, so as to conduct a switched capacitor switching on the first voltage, thus switching the inductor switching node in the each sub-switching converter between a divided voltage of the first voltage and a reference potential and to thereby execute the power conversion between the first voltage and the second voltage; wherein when both/all of the inductors of the plurality of the sub-switching converters are coupled with one another in a non-electromagnetic fashion, the multi-phase switching converter operates in a nonresonant mode; wherein when the inductors of at least two of the plurality of the sub-switching converters are electromagnetically coupled with one another, the multi-phase switching converter operates in a resonant mode or the nonresonant mode.

In one embodiment, a non-zero phase difference lies between at least two inductor currents of the at least two inductors of the at least two of the plurality of the sub-switching converters.

In one embodiment, a minimum of a number of the divided voltage is equal to one, whereas, a maximum of the number of the divided voltage is equal to a number of the plurality of the sub-switching converters minus one.

In one embodiment, the plurality of the sub-switching converters are arranged in an annular sequence, and every two of the consecutive sub-switching converters are periodically switched between the plurality of the electrical connection states, so as to switch each one of the inductor switching nodes between a divided voltage equal to ½-fold of the first voltage and the reference potential and to thereby conduct the power conversion between the first voltage and the second voltage.

In one embodiment, a number of the plurality of the sub-switching converters is equal to N, and accordingly, in this case, the all plurality of the sub-switching converters are periodically and consecutively switched between the plurality of the electrical connection states based upon an annular sequence, so as to correspondingly switch all the inductor switching nodes of all the sub-switching converters between a divided voltage equal to 1/N-fold of the first voltage and the reference potential, between a divided voltage equal to 2/N-fold of the first voltage and the reference potential, and so on to, between a divided voltage equal to N−1/N-fold of the first voltage and the reference potential, and to thereby execute the power conversion between the first voltage and the second voltage, wherein N denotes a positive integer greater than two.

In one embodiment, the portion of the plurality of the switches in one (201a) of the plurality of the sub-switching converters includes: a high-side switch, which is coupled between the first node and the capacitor of the sub-switching converter therein; a low-side switch, which is coupled between the inductor switching node of the sub-switching converter therein and the reference potential; and a crossover switch (Qcr1), which is coupled between a capacitor switching node (Nc1) and the inductor switching node (LX2) in another sub-switching converter (201b) of the plurality of the sub-switching converters, wherein the capacitor switching node (Nc1) lies between the high-side switch (QU1) of the sub-switching converter (201a) and the capacitor (C1) of the sub-switching converter (201a).

In one embodiment, the multi-phase switching converter further comprises: an auxiliary switched capacitor circuit, wherein the auxiliary switched capacitor circuit is coupled to the one of the plurality of the sub-switching converters, and wherein the auxiliary switched capacitor circuit is coupled to the another one of the plurality of the sub-switching converters, wherein the auxiliary switched capacitor circuit includes: an auxiliary capacitor; and a plurality of auxiliary switches; wherein the control circuit is further configured to operably produce a plurality of auxiliary switching signals, so as to correspondingly control the plurality of the corresponding auxiliary switches of the auxiliary switched capacitor circuit and the plurality of the corresponding switches in the one of as well as the another one of the plurality of corresponding sub-switching converters, thus periodically switching the auxiliary capacitor and the one of the plurality of the sub-switching converters and thus switching the auxiliary capacitor and the another one of the plurality of the sub-switching converters between a first auxiliary electrical connection state and a second auxiliary electrical connection state, and to thereby conduct the switched capacitor switching on the first voltage, so that a voltage across the auxiliary capacitor is regulated at an auxiliary divided voltage of the first voltage by conducting an operation of voltage biasing on the auxiliary capacitor; wherein the first auxiliary electrical connection state includes: a series connection of the capacitor of the one of the plurality of the sub-switching converters and the capacitor of the another one of the plurality of the sub-switching converters is connected in parallel between an auxiliary switching node in the auxiliary switched capacitor circuit and the reference potential; wherein the second auxiliary electrical connection state includes: a series connection of the capacitor of the one of the plurality of the sub-switching converters and the capacitor of the another one of the plurality of the sub-switching converters is connected in series between the first node and the reference potential.

In one embodiment, subsequent to a zero current time point when a zero current detection signal indicates that an inductor current flowing through the corresponding inductor is a zero current, the control circuit is further configured to operably generate the corresponding switching signal for switching the corresponding switch, thereby switching the corresponding electrical connection state.

In one embodiment, subsequent to the zero current time point, after waiting for a dead-time, the control circuit is configured to operably generate the corresponding switching signal for switching the corresponding switch, thereby switching the corresponding electrical connection state.

In one embodiment, the corresponding switch accomplishes a soft switching of a zero current switching (ZCS) and/or the soft switching of a zero voltage switching (ZVS).

In one embodiment, based upon the first voltage, the second voltage and a load level, the control circuit is configured to operably generate the corresponding switching signal for switching the corresponding switch, thereby switching the corresponding electrical connection state, to magnetize the corresponding inductor within a constant ON time.

In one embodiment, in accordance with a load level, the control circuit is configured to operably generate the corresponding switching signal for switching the corresponding switch, thereby switching the corresponding electrical connection state, and wherein the control circuit is configured to operably render the plurality of the sub-switching converters to operate in a boundary conduction mode (BCM), a continuous conduction mode (CCM) or a discontinuous conduction mode (DCM).

In one embodiment, subsequent to a scenario where the corresponding inductor is being demagnetized and subsequent to a case where an inductor current flowing through the corresponding inductor is a zero current, after waiting for a delay time, the control circuit is configured to operably switch the corresponding switch, thereby switching the corresponding electrical connection state.

In one embodiment, the control circuit includes: a zero current detection circuit, wherein when an inductor current flowing through the corresponding inductor is a zero current, the zero current detection circuit is configured to operably produce a zero current detection signal for switching the corresponding switch.

In one embodiment, in a case where the multi-phase switching converter operates in the resonant mode, the control circuit is configured to operably produce a zero current detection signal for switching the corresponding switch according to a scenario when the control circuit detects that an inductor current flowing through the corresponding inductor is a zero current.

In one embodiment, the control method further comprises following steps: periodically switching every two of the consecutive sub-switching converters arranged in an annular sequence between the plurality of the electrical connection states by the plurality of the corresponding switching signals, so as to switch each one of the inductor switching nodes between a divided voltage equal to ½-fold of the first voltage and the reference potential and to thereby conduct the power conversion between the first voltage and the second voltage.

In one embodiment, a number of the plurality of the sub-switching converters is equal to N, and accordingly, in this case, the control method further comprises following steps: periodically switching every two of the consecutive sub-switching converters arranged in an annular sequence between the plurality of the electrical connection states by the plurality of the corresponding switching signals, so as to switch each one of the inductor switching nodes between a divided voltage equal to ½-fold of the first voltage and the reference potential and to thereby conduct the power conversion between the first voltage and the second voltage.

In one embodiment, the control method further comprises following steps: producing a plurality of auxiliary switching signals, so as to correspondingly control a plurality of corresponding auxiliary switches of an auxiliary switched capacitor circuit and the plurality of the corresponding switches in the one of as well as the another one of the plurality of corresponding sub-switching converters, thus periodically switching the auxiliary capacitor and the one of the plurality of the sub-switching converters and thus switching the auxiliary capacitor and the another one of the plurality of the sub-switching converters between a first auxiliary electrical connection state and a second auxiliary electrical connection state, and to thereby conduct the switched capacitor switching on the first voltage, so that a voltage across the auxiliary capacitor is regulated at an auxiliary divided voltage of the first voltage by conducting an operation of voltage biasing on the auxiliary capacitor, wherein the auxiliary switched capacitor circuit is coupled to the one of the plurality of the sub-switching converters, and wherein the auxiliary switched capacitor circuit is coupled to the another one of the plurality of the sub-switching converters; wherein the first auxiliary electrical connection state includes: a series connection of the capacitor of the one of the plurality of the sub-switching converters and the capacitor of the another one of the plurality of the sub-switching converters is connected in parallel between an auxiliary switching node in the auxiliary switched capacitor circuit and the reference potential; wherein the second auxiliary electrical connection state includes: a series connection of the capacitor of the one of the plurality of the sub-switching converters and the capacitor of the another one of the plurality of the sub-switching converters is connected in series between the first node and the reference potential.

In one embodiment, the control method further comprises following steps: subsequent to a zero current time point when a zero current detection signal indicates that an inductor current flowing through the corresponding inductor is a zero current, switching the corresponding switch by the corresponding switching signal, thereby switching the corresponding electrical connection state.

In one embodiment, the control method further comprises following steps: subsequent to the zero current time point, after waiting for a dead-time, switching the corresponding switch via the corresponding switching signal, thereby switching the corresponding electrical connection state.

In one embodiment, based upon the first voltage, the second voltage and a load level, generating the corresponding switching signal for switching the corresponding switch, thereby switching the corresponding electrical connection state; and magnetizing the corresponding inductor within a constant ON time.

In one embodiment, in accordance with a load level, generating the corresponding switching signal for switching the corresponding switch, thereby switching the corresponding electrical connection state; and rendering the plurality of the sub-switching converters to operate in a boundary conduction mode (BCM), a continuous conduction mode (CCM) or a discontinuous conduction mode (DCM).

In one embodiment, the control method further comprises following steps: subsequent to a scenario when the corresponding inductor is being demagnetized and subsequent to a case when an inductor current flowing through the corresponding inductor is a zero current, after waiting for a delay time, switching the corresponding switch, thereby switching the corresponding electrical connection state.

In one embodiment, the control method further comprises following steps: when an inductor current flowing through the corresponding inductor is a zero current, producing a zero current detection signal for switching the corresponding switch.

In one embodiment, the control method further comprises following steps: in a case where the multi-phase switching converter operates in the resonant mode, producing a zero current detection signal for switching the corresponding switch according to a scenario when an inductor current flowing through the corresponding inductor is a zero current is being detected.

The present invention is advantageous over the prior art, in that: the multi-phase switching converter of the present invention is well capable of accomplishing a relatively greater power conversion efficiency; and that, the present invention is well able to adopt an inductor having a relatively smaller size; and that, the present invention has capacity to produce a relatively lower voltage stress on the components within the multi-phase switching converter.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
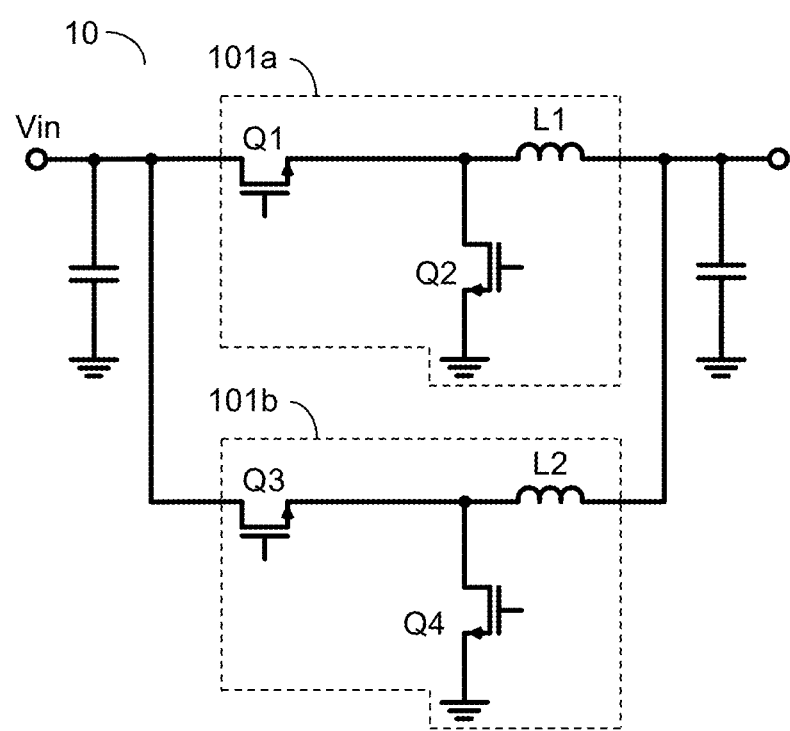
FIG. 1 shows a schematic circuit diagram of a conventional dual-phase converter circuit.
Figure 2A:
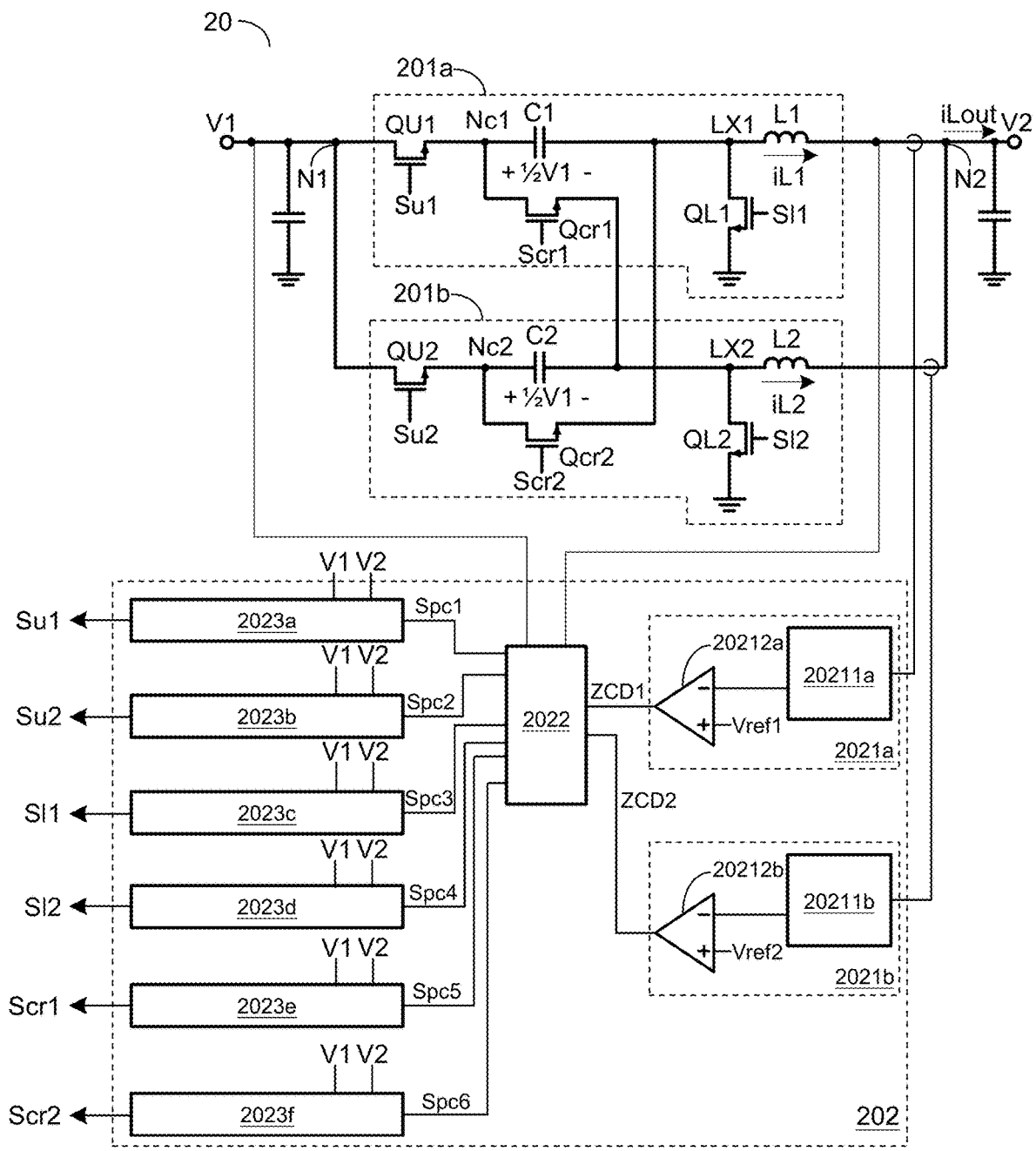
FIG. 2A shows a schematic circuit diagram of a multi-phase switching converter according to an exemplary embodiment of the present invention.

FIG. 2A shows a schematic circuit diagram of a multi-phase switching converter according to an exemplary embodiment of the present invention. As shown in FIG. 2A, the multi-phase switching converter 20 of the present invention is configured to operably execute a power conversion between a first voltage V1 at a first node N1 and a second voltage V2 at a second node N2. The multi-phase switching converter 20 of the present invention comprises: plural sub-switching converters 201a and 201b and a control circuit 202. The control circuit 202 is configured to operably generate plural switching signals Su1, Su2, Sl1, Sl2, Scr1 and Scr2, so as to correspondingly control plural corresponding switches QU1, QU2, QL1, QL2, Qcr1 and Qcr2 of the plural corresponding sub-switching converters 201a and 201b, thus periodically switching the plural sub-switching converters 201a and 201b between plural corresponding electrical connection states and to thereby execute the power conversion between the first voltage V1 and the second voltage V2.

As shown in FIG. 2A, each sub-switching converter (201a/201b) includes: a capacitor (C1/C2), an inductor (L1/L2) and a portion of the plural switches (QU1, QL1, Qcr1/QU2, QL2, Qcr2). To elaborate in more detail, the sub-switching converter 201a includes: the capacitor C1, the inductor L1 and the portion of the plural switches QU1, QL1, and Qcr1, whereas, the sub-switching converter 201b includes: the capacitor C2, the inductor L2 and the portion of the plural switches QU2, QL2 and Qcr2. Additionally, the inductor (L1/L2) has one end coupled to the second node N2, whereas, another end of the inductor (L1/L2) and the capacitor (C1/C2) are coupled to an inductor switching node (LX1/LX2)in the each sub-switching converter (201a/201b) where the corresponding inductor (L1/L2) is located within this very each sub-switching converter (201a/201b). To elaborate in more detail, on one hand, the inductor L1 has one end coupled to the second node N2, whereas, another end of the inductor L1 and the capacitor C1 are coupled to the inductor switching node LX1 in the sub-switching converter 201a where the corresponding inductor L1 is located within this very sub-switching converter 201a. On the other hand, the inductor L2 has the one end coupled to the second node N2, whereas, another end of the inductor L2 and the capacitor C2 are coupled to the inductor switching node LX2 in the sub-switching converter 201b where the corresponding inductor L2 is located within this very sub-switching converter 201b. Between the plural electrical connection states, the plural corresponding switching signals Su1, Su2, Sl1, Sl2, Scr1 and Scr2 operate the capacitor (e.g., capacitor C1) of one (e.g., sub-switching converter 201a) of the plural sub-switching converters (i.e., sub-switching converter 201a and sub-switching converter 201b) and the capacitor (e.g., capacitor C2) of another one (e.g., sub-switching converter 201b) of the plural sub-switching converters (i.e., sub-switching converter 201a and sub-switching converter 201b), so as to conduct a switched capacitor switching on the first voltage V1, thus switching the inductor switching node (LX1/LX2) in the each sub-switching converter (201a/201b) between a divided voltage of the first voltage and a reference potential (e.g., a ground potential) and to thereby execute the power conversion between the first voltage V1 and the second voltage V2. In one embodiment, a minimum of a number of the foregoing divided voltage is equal to one, whereas, a maximum of the number of the aforementioned divided voltage is equal to a number of the plural sub-switching converters minus one.

As shown in FIG. 2A, the portion of the plural switches in the sub-switching converter 201a include: a high-side switch QU1, a low-side switch QL1 and a cross-over switch Qcr1. As a consequence, in this case, the high-side switch QU1 is coupled between the first node N1 and the capacitor C1 of the sub-switching converter 201a where the corresponding high-side switch QU1 is located within this very sub-switching converter 201a. As a consequence, in this case, the low-side switch QL1 is coupled between the inductor switching node LX1 of the sub-switching converter 201a where the corresponding low-side switch QL1 is located within this very sub-switching converter 201a and the reference potential (e.g., as shown by a ground potential in FIG. 2A). The cross-over switch Qcr1 is coupled between a capacitor switching node Nc1 which lies between the high-side switch QU1 of the sub-switching converter 201a where the corresponding cross-over switch Qcr1 is located within this very sub-switching converter 201a and the capacitor C1 of the sub-switching converter 201a and the inductor switching node LX2 in the sub-switching converter 201b. Moreover, as shown in FIG. 2A, the portion of the plural switches in the sub-switching converter 201b include: a high-side switch QU2, a low-side switch QL2 and a cross-over switch Qcr2. As a consequence, in this case, the high-side switch QU2 is coupled between the first node N1 and the capacitor C2 of the sub-switching converter 201b where the corresponding high-side switch QU2 is located within this very sub-switching converter 201b. As a consequence, in this case, the low-side switch QL2 is coupled between the inductor switching node LX2 of the sub-switching converter 201b where the corresponding low-side switch QL2 is located within this very sub-switching converter 201b and the reference potential (e.g., as shown by the ground potential in FIG. 2A). The cross-over switch Qcr2 is coupled between a capacitor switching node Nc2 which lies between the high-side switch QU2 of the sub-switching converter 201b where the corresponding cross-over switch Qcr2 is located within this very sub-switching converter 201b and the capacitor C2 of the sub-switching converter 201b and the inductor switching node LX1 in the sub-switching converter 201a.

As shown in FIG. 2A, based upon the first voltage V1, the second voltage V2, an inductor current iL1, an inductor current iL2 and a load level, the control circuit 202 is configured to operably generate the corresponding switching signal (e.g., Su1, Su2, Sl1, Sl2, Scr1 or Scr2) for switching the corresponding switch (e.g., QU1, QU2, QL1, QL2, Qcr1 or Qcr2), thereby switching the corresponding electrical connection state. In addition, as a result in this case, the control circuit 202 is configured to operably magnetize the corresponding inductor (e.g., L1 or L2) within a constant ON time. The control circuit 202 includes: a zero current detection circuit 2021a, a zero current detection circuit 2021b, a phase control logic circuit 2022 and ON time controller circuits 2023a~2023f. The zero current detection circuit 2021a is coupled between the phase control logic circuit 2022 and the second voltage V2 and the zero current detection circuit 2021a is configured to operably detect the inductor current iL1. The zero current detection circuit 2021b is coupled between the phase control logic circuit 2022 and the second voltage V2 and the zero current detection circuit 2021b is configured to operably detect the inductor current iL2. In a case when the zero current detection circuit 2021a detects that the inductor current iL1 is zero current, the zero current detection circuit 2021a is configured to operably produce a zero current detection signal ZCD1 which is accordingly inputted to the phase control logic circuit 2022. In a case when the zero current detection circuit 2021b detects that the inductor current iL2 is zero current, the zero current detection circuit 2021b is configured to operably produce a zero current detection signal ZCD2 which is accordingly inputted to the phase control logic circuit 2022. The zero current detection circuit 2021a comprises a corresponding current sensing circuit 20211a configured to operably sense the inductor current iL1, whereas, the zero current detection circuit 2021b comprises a corresponding current sensing circuit 20211b configured to operably sense the inductor current iL2. The zero current detection circuit 2021a comprises a corresponding comparator 20212a configured to operably compare the thus sensed inductor current iL1 with a reference signal Vref1, so as to generate the zero current detection signal ZCD1, whereas, the zero current detection circuit 2021b comprises a corresponding comparator 20212b configured to operably compare the thus sensed inductor current iL2 with a reference signal Vref2, so as to generate the zero current detection signal ZCD2.

The phase control logic circuit 2022 is configured to operably generate phase control signals Spc1~Spc6 according to the first voltage V1, the second voltage V2, the zero current detection signal ZCD1 and/or the zero current detection signal ZCD2. According to the phase control signals Spc1~Spc6, the first voltage V1 and the second voltage V2, the ON time controller circuit 2023a, the ON time controller circuit 2023b, the ON time controller circuit 2023c, the ON time controller circuit 2023d, the ON time controller circuit 2023e and the ON time controller circuit 2023f serve to generate the switching signal Su1, the switching signal Su2, the switching signal Sl1, the switching signal Sl2, the switching signal Scr1 and the switching signal Scr2, respectively.

Figure 8:
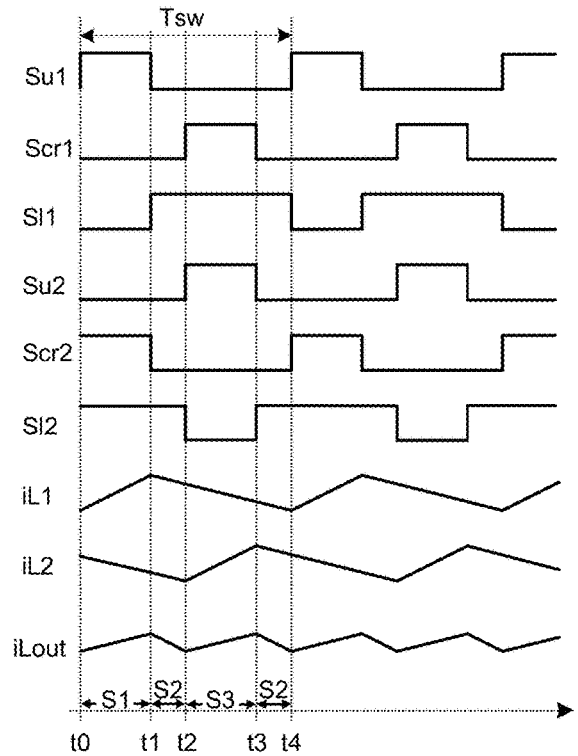
FIG. 8 illustrates signal waveform diagrams depicting signals associated with the operation of a multi-phase switching converter of FIG. 2A according to an exemplary embodiment of the present invention.

FIG. 8 illustrates signal waveform diagrams depicting signals associated with the operation of a multi-phase switching converter of FIG. 2A according to an exemplary embodiment of the present invention. Please refer to FIG. 2A along with FIG. 8. When the inductors (i.e., inductors L1 and L2) of each (i.e., sub-switching converter 201a or sub-switching converter 201b) of the plural sub-switching converters (i.e., sub-switching converter 201a and sub-switching converter 201b) are coupled with one another in a non-electromagnetic fashion (that is, in this case, switching frequencies of the switching signals Su1, Su2, Sl1, Sl2, Scr1 and Scr2 are immensely higher than a resonant frequency), the multi-phase switching converter 20 operates in a nonresonant mode. As shown in FIG. 8, a non-zero phase difference lies between at least two inductor currents (e.g., iL1 and iL2) of the at least two inductors (e.g., L1 and L2) of the at least two (i.e., sub-switching converter 201a and sub-switching converter 201b) of the plural sub-switching converters (i.e., sub-switching converter 201a and sub-switching converter 201b). As shown in FIG. 2A and FIG. 8, between the plural electrical connection states, the plural sub-switching converters (i.e., sub-switching converter 201a and sub-switching converter 201b) are configured to operably and periodically switch the two consecutive sub-switching converters (note that, because the embodiment shown in FIG. 2A includes only two sub-switching converters 201a and 201b, during every switching period Tsw, only these two sub-switching converters 201a and 201b will conduct an operation of switching) based upon an annular sequence (i.e., let it be assumed that a first electrical connection state S1, a second electrical connection state S2, a third electrical connection state S3 and the second electrical connection state S2 constitute a switching period Tsw; as a result, in this case, the two sub-switching converter 201a and 201b are switched within a switching period Tsw in a consecutive and repeated fashion), so as to switch the inductor switching node (e.g., LX1 or LX2) between a divided voltage (i.e., ½*V1) equal to ½-fold of the first voltage V1 and the reference potential (e.g., in this embodiment, the reference potential is literally a ground potential) and to thereby conduct the power conversion between the first voltage V1 and the second voltage V2.

Figure 2B:
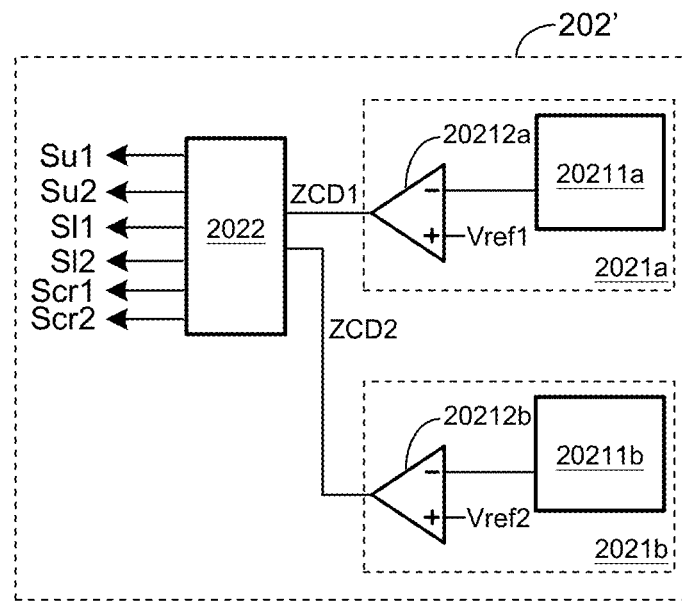
FIG. 2B shows a schematic circuit diagram of a control circuit in a multi-phase switching converter according to another exemplary embodiment of the present invention.

FIG. 2B shows a schematic circuit diagram of a control circuit in a multi-phase switching converter according to another exemplary embodiment of the present invention. The control circuit 202' of this embodiment shown in FIG. 2B is similar to the control circuit 202 of the embodiment shown in FIG. 2A, but is different in that: as compared to the control circuit 202 of the embodiment shown in FIG. 2A, the control circuit 202' of this embodiment shown in FIG. 2B omits the ON time controller circuits 2023a~2023f as well as the phase control signals Spc1~Spc6. That is, the phase control logic circuit 2022 serve to straightforwardly generatee switching signals Su1, Su2, Sl1, Sl2, Scr1 and Scr2 based upon the zero current detection signal ZCD1 or the zero current detection signal ZCD2.

FIG. 2C to FIG. 2F respectively show schematic diagrams of embodiments of plural electrical connection states of the multi-phase switching converter 20 of the present invention. FIG. 2C to FIG. 2F are meant to elucidate that: within a first electrical connection state S1, a second electrical connection state S2, a third electrical connection state S3 and a fourth electrical connection state S4, what electrical connection relationships between the capacitors C1 and C2, the inductors L1 and L2 in the multi-phase switching converter 20 and the first voltage V1, the second voltage V2 and the reference potential (e.g., in this embodiment, the reference potential is literally a ground potential) looks like. In other embodiments, periodically repeating these electrical connection states by selecting a combination of plural electrical connection states from the first electrical connection state S1, the second electrical connection state S2, the third electrical connection state S3 and/or the fourth electrical connection state S4, thereby executing the power conversion between the first voltage V1 and the second voltage V2. Note that, in FIGS. 2C to 2F, when a switch symbol is depicted in a lighter grey, it indicates that the switch is OFF; and when a switch symbol is depicted in a darker black, it indicates that the switch is ON.

Figure 2C:
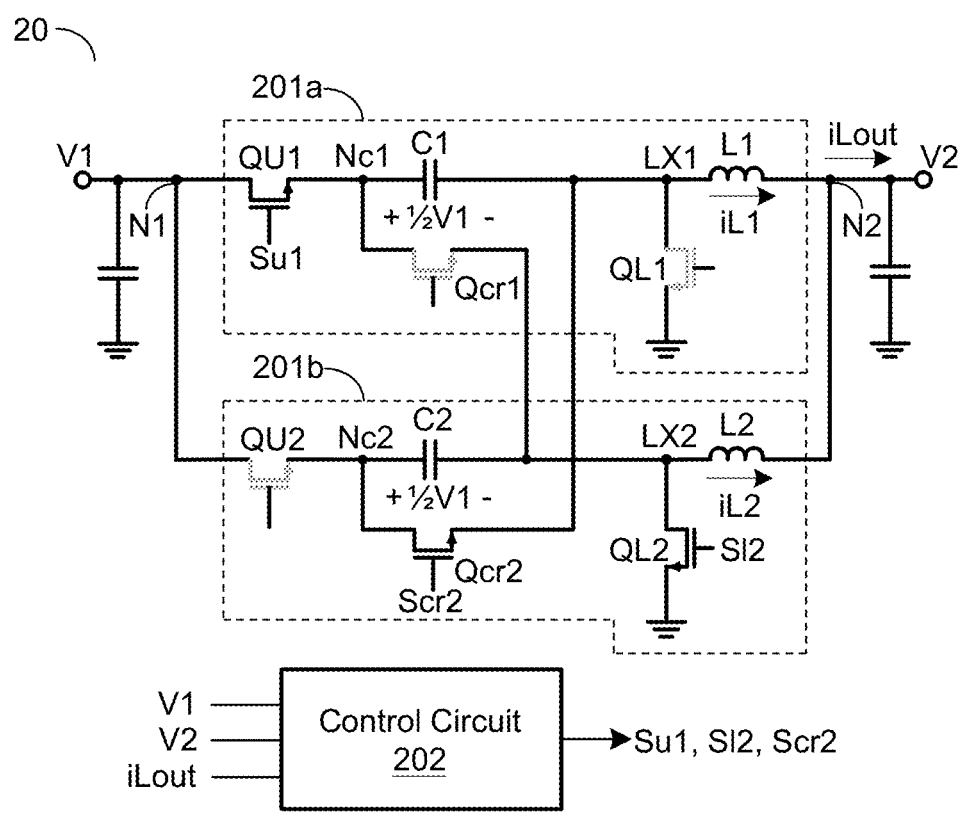
FIG. 2C to FIG. 2F respectively show schematic diagrams of embodiments of plural electrical connection states of a multi-phase switching converter of the present invention.

As shown in FIG. 2C and FIG. 8, within the first electrical connection state S1, the high-side switch QU2, the cross-over switch Qcr1 and the low-side switch QL1 are switched to become OFF, whereas, the high-side switch QU1, the cross-over switch Qcr2 and the low-side switch QL2 are switched to become ON, such that the capacitor C1 and the capacitor C2 are connected in series between the first voltage V1 and the reference potential (e.g., in this embodiment, the reference potential is literally a ground potential), the capacitor C1 and the capacitor C2 are coupled to a capacitor switching node Nc2, the inductor L1 is coupled between the capacitor switching node Nc2 and the second voltage V2 and the inductor L2 is coupled between the reference potential and the second voltage V2.

Figure 2D:
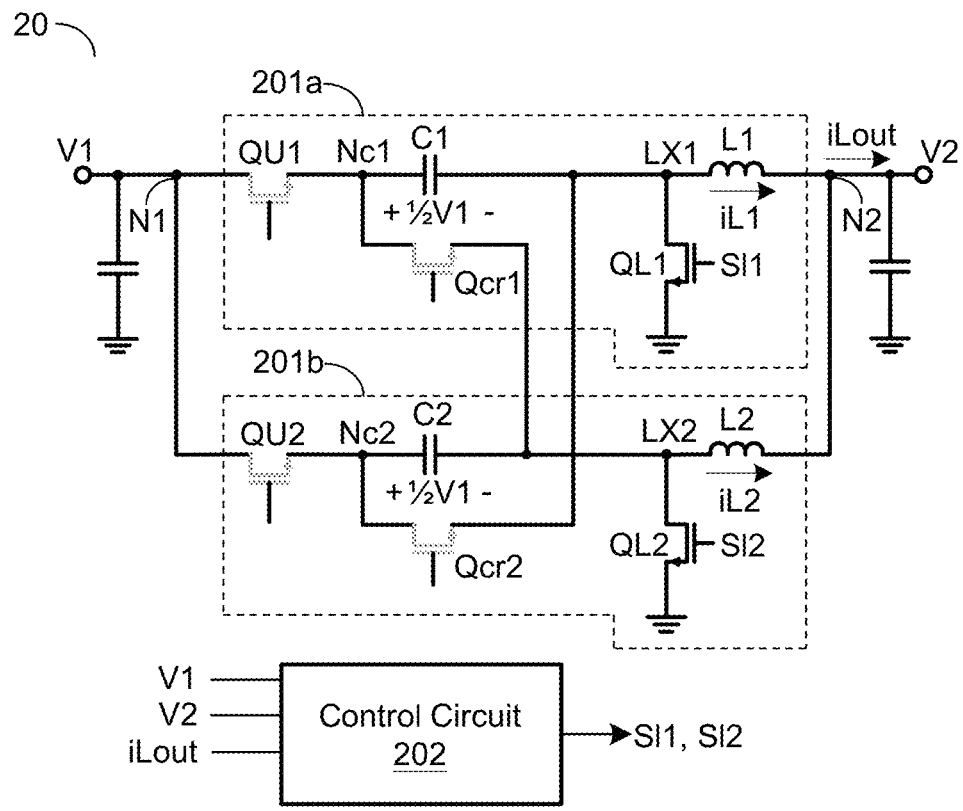

As shown in FIG. 2D and FIG. 8, within the second electrical connection state S2, the high-side switches QU1 and QU2 and the cross-over switches Qcr1 and Qcr2 are switched to become OFF, whereas, the low-side switches QL1 and QL2 are switched to become ON, such that the inductors L1 and L2 are coupled between the reference potential and the second voltage V2.

Figure 2E:
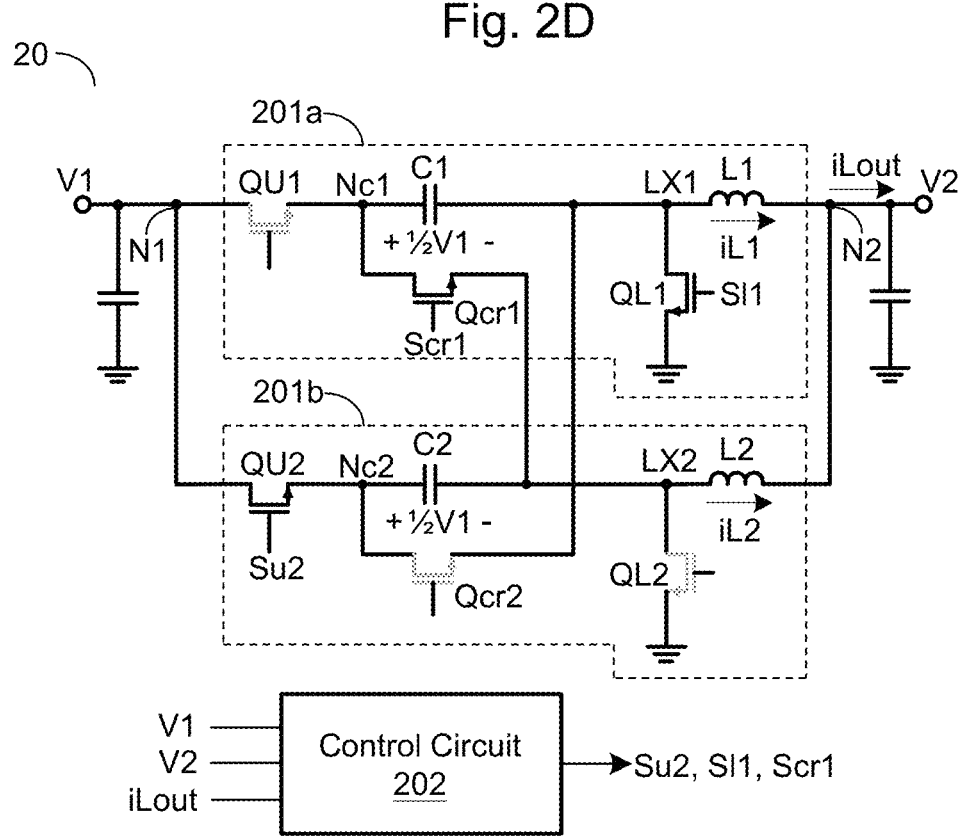

As shown in FIG. 2E and FIG. 8, within the third electrical connection state S3, the high-side switch QU1, the cross-over switch Qcr2 and the low-side switch QL2 are switched to become OFF, whereas, the high-side switch QU2, the cross-over switch Qcr1 and the low-side switch QL1 are switched to become ON, such that the capacitor C2 and the capacitor C1 are connected in series between the first voltage V1 and the reference potential (e.g., in this embodiment, the reference potential is literally a ground potential), the capacitor C2 and the capacitor C1 are coupled to a capacitor switching node Nc1, the inductor L2 is coupled between the capacitor switching node Nc1 and the second voltage V2 and the inductor L1 is coupled between the reference potential and the second voltage V2.

Figure 2F:
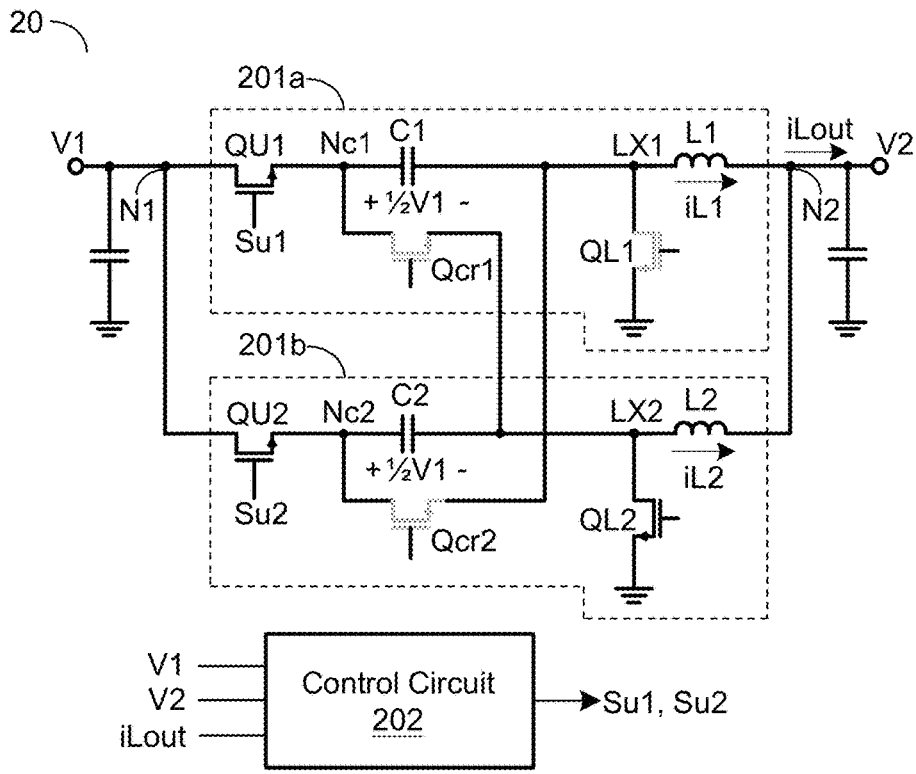

As shown in FIG. 2F and FIG. 8, within the fourth electrical connection state S4, the cross-over switches Qcr1 and Qcr2 and the low-side switches QL1 and QL2 are switched to become OFF, whereas, the high-side switches QU1 and QU2 are switched to become ON, such that a series connection of the capacitor C1 and the inductor L1 is connected in parallel between the first voltage V1 and the second voltage V2 and a series connection of the capacitor C2 and the inductor L2 is connected in parallel between the first voltage V1 and the second voltage V2.

Figure 3:
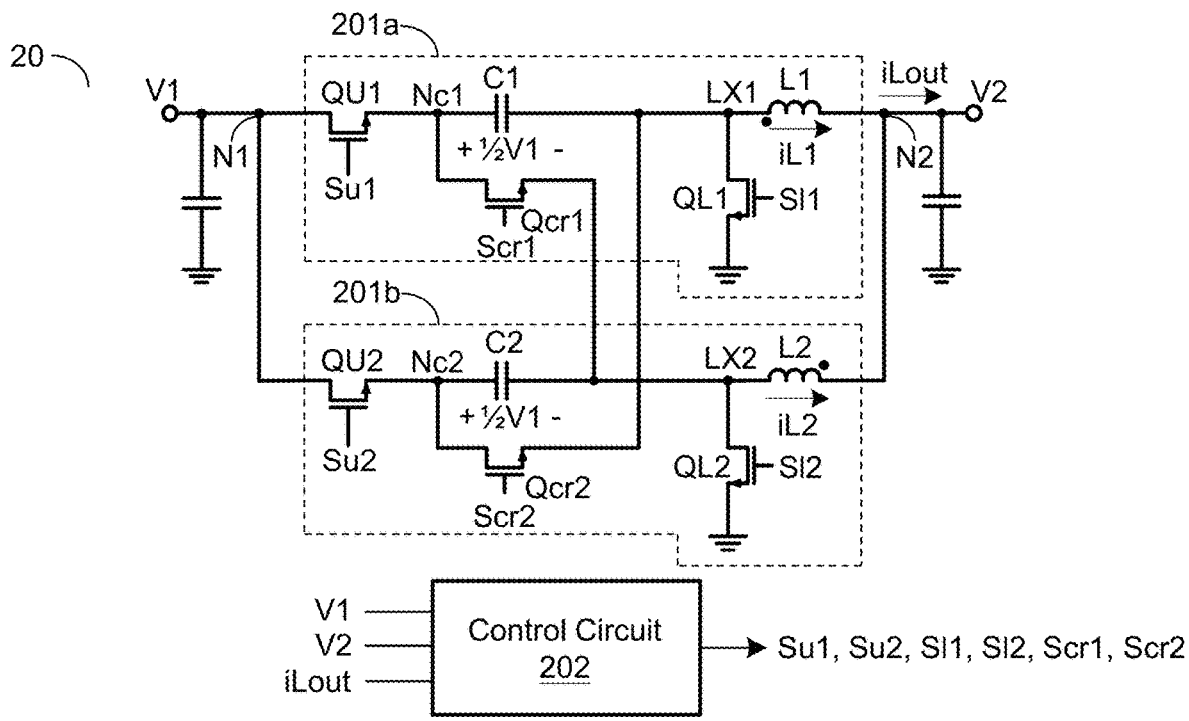
FIG. 3 shows a schematic circuit diagram of a multi-phase switching converter according to yet another exemplary embodiment of the present invention.
Figure 10:
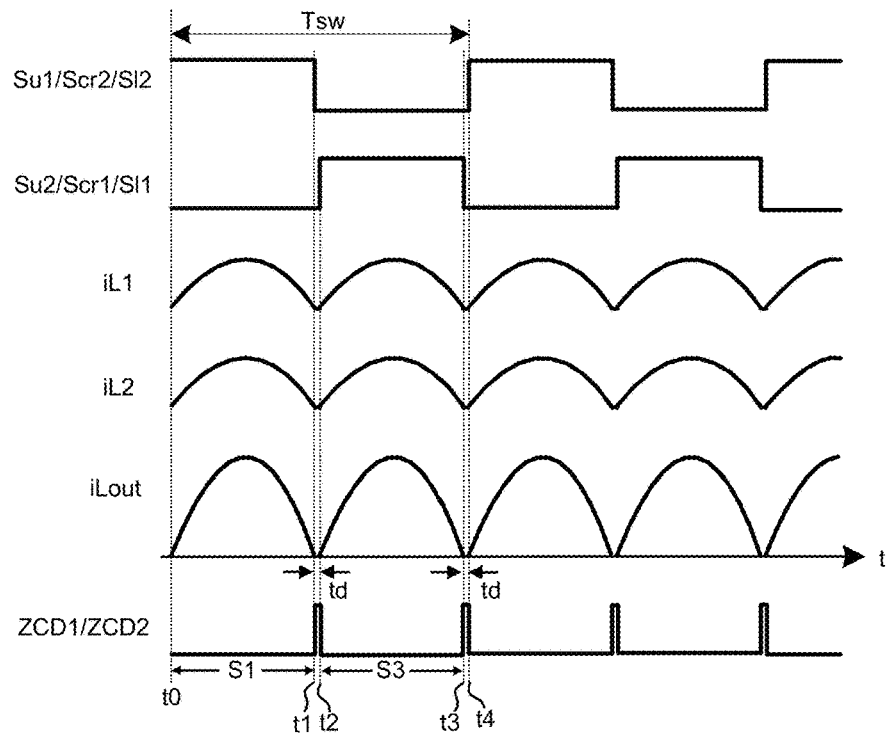
FIG. 10 illustrates signal waveform diagrams depicting signals associated with the operation of a multi-phase switching converter of FIG. 3 according to an exemplary embodiment of the present invention.
Figure 11:
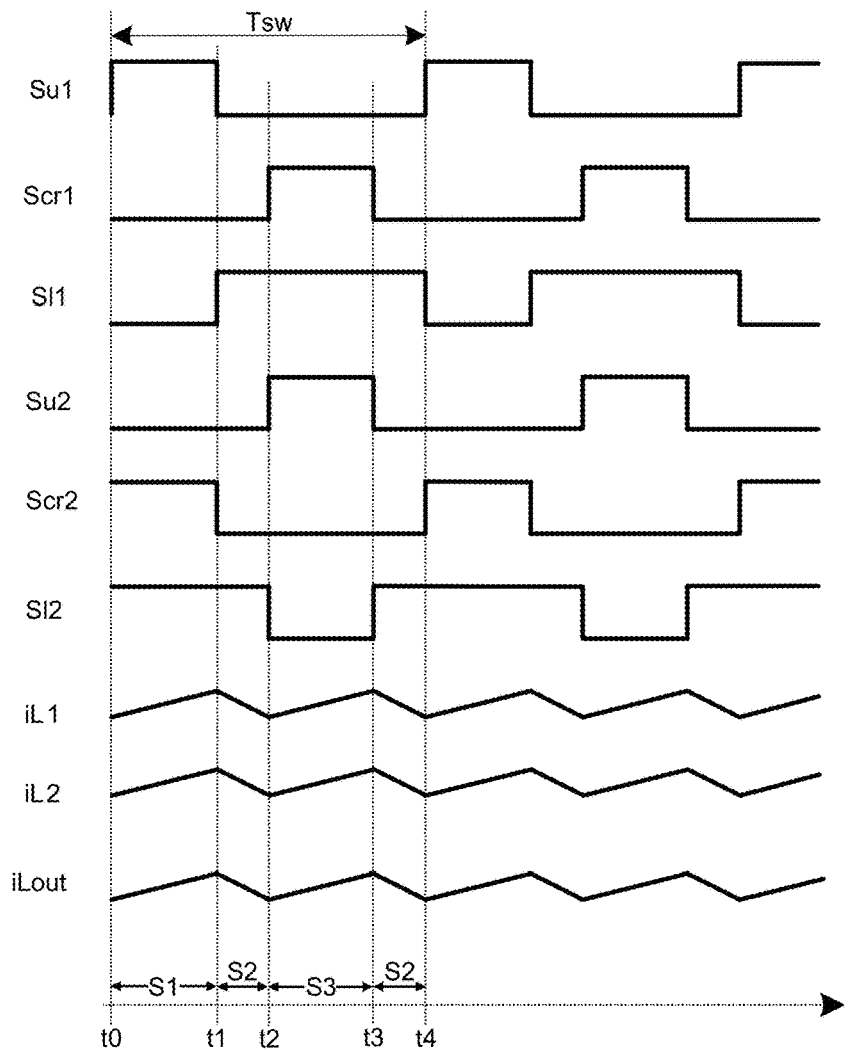
FIG. 11 illustrates signal waveform diagrams depicting signals associated with the operation of a multi-phase switching converter of FIG. 3 according to another exemplary embodiment of the present invention.

FIG. 3 shows a schematic circuit diagram of a multi-phase switching converter according to yet another exemplary embodiment of the present invention. As shown in FIG. 3, the multi-phase switching converter 20 of this embodiment shown in FIG. 3 is similar to the multi-phase switching converter 20 of the embodiment shown in FIG. 2A, but is different in that: as compared to the multi-phase switching converter 20 of the embodiment shown in FIG. 2A, in the multi-phase switching converter 20 of this embodiment shown in FIG. 3, an inductor L1 and an inductor L2 are electromagnetically coupled with each other. It is worthwhile mentioning that, in other embodiments where a multi-phase switching converter comprises different numbers of sub-switching converters, the inductors of these sub-switching converters can be electromagnetically coupled with each other two by two. FIG. 10 illustrates signal waveform diagrams depicting signals associated with the operation of a multi-phase switching converter of FIG. 3 according to an exemplary embodiment of the present invention. FIG. 11 illustrates signal waveform diagrams depicting signals associated with the operation of a multi-phase switching converter of FIG. 3 according to another exemplary embodiment of the present invention. Please refer to FIG. 3 along with FIG. 10. When the inductors inductor (i.e., L1 and L2) of at least two (i.e., sub-switching converter 201a and sub-switching converter 201b) of the plural sub-switching converters (i.e., sub-switching converter 201a and sub-switching converter 201b) are electromagnetically coupled with one another, the multi-phase switching converter 20 operates in a resonant mode. In another embodiment, please refer to FIG. 3 along with FIG. 11. When the inductors inductor (i.e., L1 and L2) of at least two (i.e., sub-switching converter 201a and sub-switching converter 201b) of the plural sub-switching converters (i.e., sub-switching converter 201a and sub-switching converter 201b) are electromagnetically coupled with one another, the multi-phase switching converter 20 operates in a nonresonant mode. In one embodiment, the control circuit 202 shown in FIG. 3 can be implemented through adopting a configuration of the control circuit 202 shown in FIG. 2A or a configuration of the control circuit 202' shown in FIG. 2B.

Figure 4:
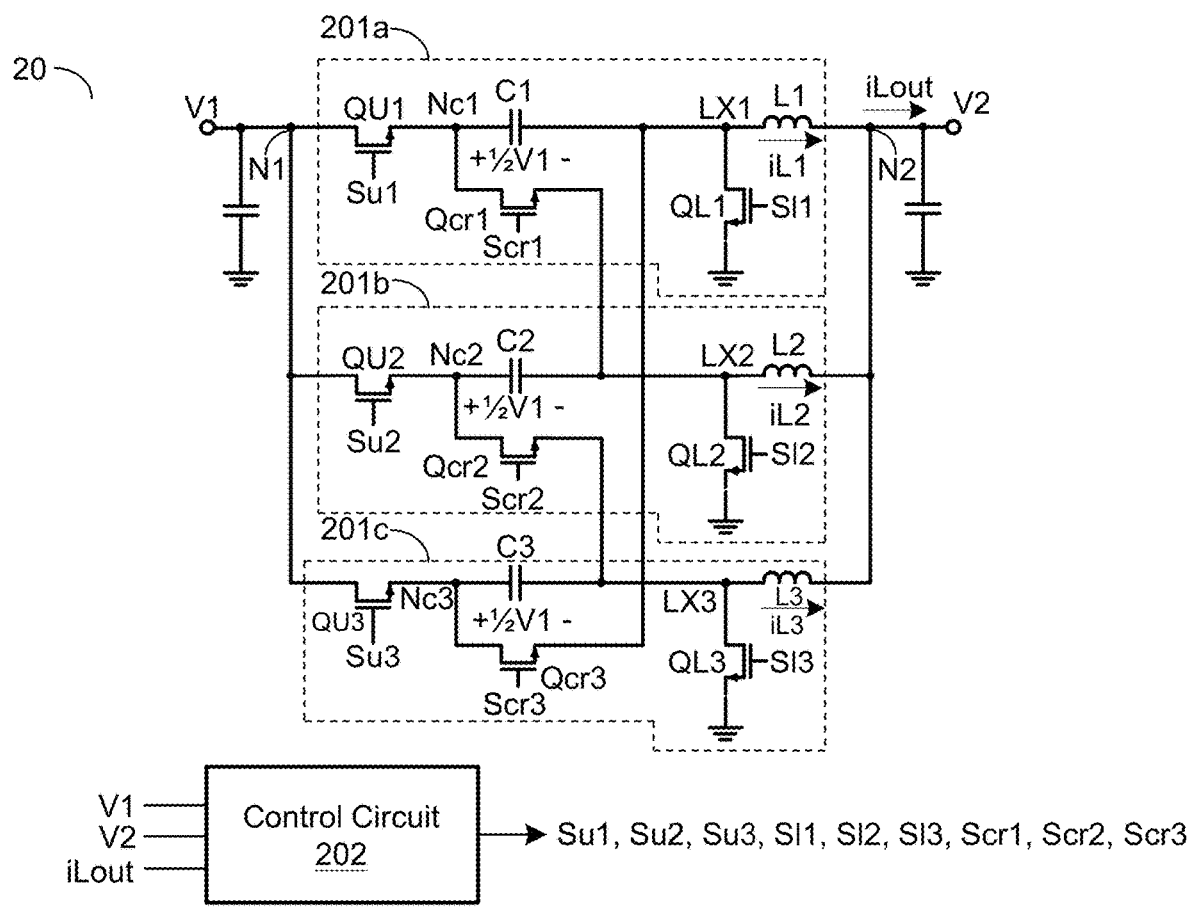
FIG. 4 shows a schematic circuit diagram of a multi-phase switching converter according to still another exemplary embodiment of the present invention.

FIG. 4 shows a schematic circuit diagram of a multi-phase switching converter according to still another exemplary embodiment of the present invention. The multi-phase switching converter 20 of this embodiment shown in FIG. 4 is similar to the multi-phase switching converter 20 of the embodiment shown in FIG. 2A, but is different in that: as compared to the multi-phase switching converter 20 of the embodiment shown in FIG. 2A, the multi-phase switching converter 20 of this embodiment shown in FIG. 4 is implemented as including three sub-switching converters 201a, 201b and 201c. It is worthwhile mentioning that, it should be understood that the implementation of the number for the sub-switching converter as two in the above-mentioned preferred embodiment is only an illustrative example, but not for limiting the broadest scope of the present invention. That is, the present invention is not limited by the number for the sub-switching converter shown in the above-mentioned preferred embodiment. In other embodiments, it is also practicable and within the broadest scope of the present invention that the implementation of the number for the sub-switching converter as a positive integer greater than one. In one embodiment, between the plural electrical connection states, the plural sub-switching converters (i.e., sub-switching converter 201a, sub-switching converter 201b and sub-switching converter 201c) are configured to operably and periodically switch the two consecutive sub-switching converters (e.g., sub-switching converter 201a and sub-switching converter 201b; or, sub-switching converter 201b and sub-switching converter 201c; or, sub-switching converter 201c and sub-switching converter 201a) based upon an annular sequence, so as to switch the inductor switching node (e.g., LX1 or LX2; LX2 or LX3; LX3 or LX1) between a divided voltage (i.e., ½*V1) equal to ½-fold of the first voltage V1 and the reference potential and to thereby conduct the power conversion between the first voltage V1 and the second voltage V2. In one embodiment, the control circuit 202 shown in FIG. 4 can be implemented through adopting a configuration of the control circuit 202 shown in FIG. 2A or a configuration of the control circuit 202' shown in FIG. 2B.

Figure 5:
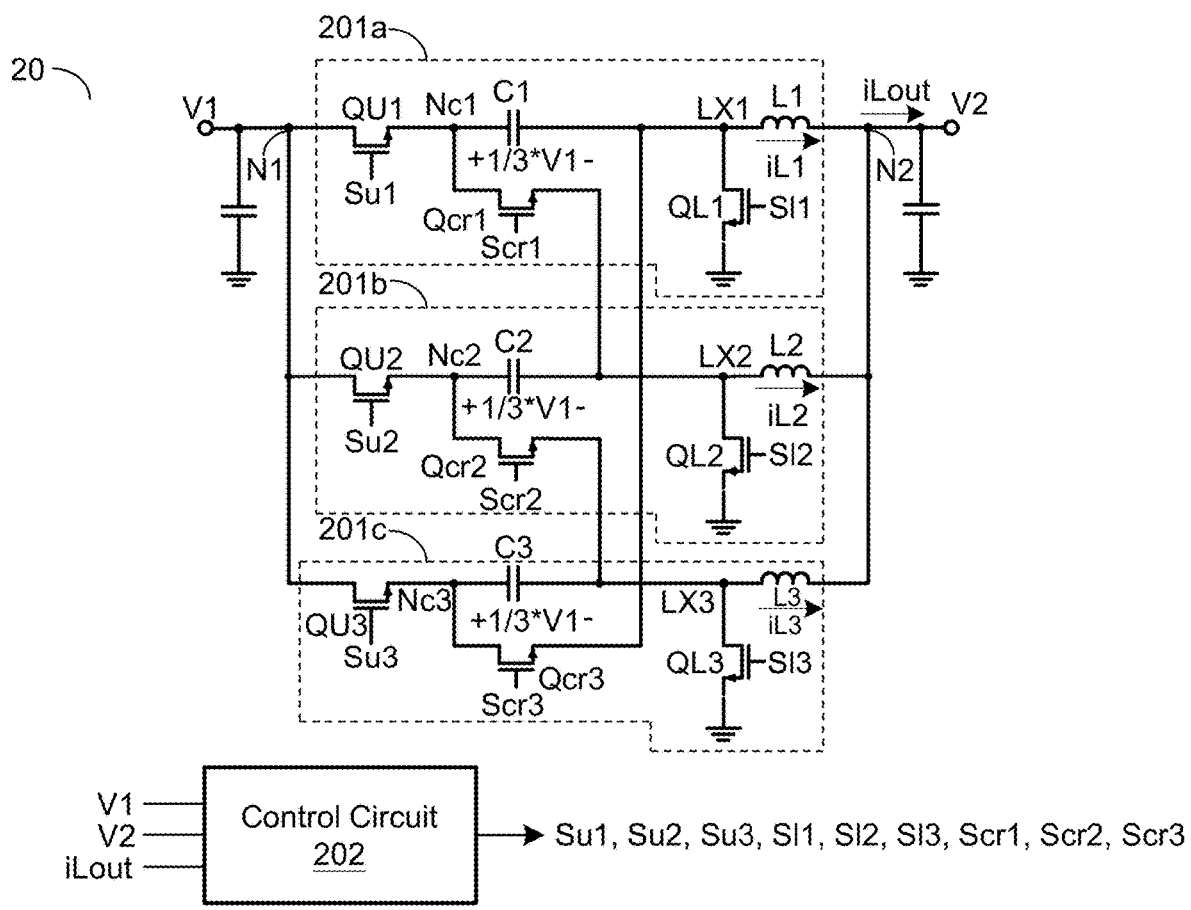
FIG. 5 shows a schematic circuit diagram of a multi-phase switching converter according to still another exemplary embodiment of the present invention.

FIG. 5 shows a schematic circuit diagram of a multi-phase switching converter according to still another exemplary embodiment of the present invention. The multi-phase switching converter 20 of this embodiment shown in FIG. 5 is similar to the multi-phase switching converter 20 of the embodiment shown in FIG. 4, but is different in that: as compared to the multi-phase switching converter 20 of the embodiment shown in FIG. 4, the multi-phase switching converter 20 of this embodiment shown in FIG. 5 is configured to operably and periodically switch three consecutive sub-switching converters 201a, 201b and 201c. In one embodiment, a number for the sub-switching converters is equal to three. As a result, in this case, between the plural electrical connection states, the plural sub-switching converters (i.e., sub-switching converter 201a, sub-switching converter 201b and sub-switching converter 201c) are periodically switched between the plurality of the electrical connection states consecutively (i.e., sub-switching converter 201a, sub-switching converter 201b and sub-switching converter 201c) based upon an annular sequence, so as to correspondingly switch all the inductor switching nodes (i.e., LX1, LX2 and LX3) of all the sub-switching converters (i.e., sub-switching converter 201a, sub-switching converter 201b and sub-switching converter 201c) between a divided voltage (i.e., ⅓*V1) equal to ⅓-fold of the first voltage V1 and the reference potential and between a divided voltage (i.e., ⅔*V1) equal to ⅔-fold of the first voltage V1 and the reference potential, and to thereby execute the power conversion between the first voltage V1 and the second voltage V2. In one embodiment, the control circuit 202 shown in FIG. 5 can be implemented through adopting a configuration of the control circuit 202 shown in FIG. 2A or a configuration of the control circuit 202' shown in FIG. 2B.

Figure 6:
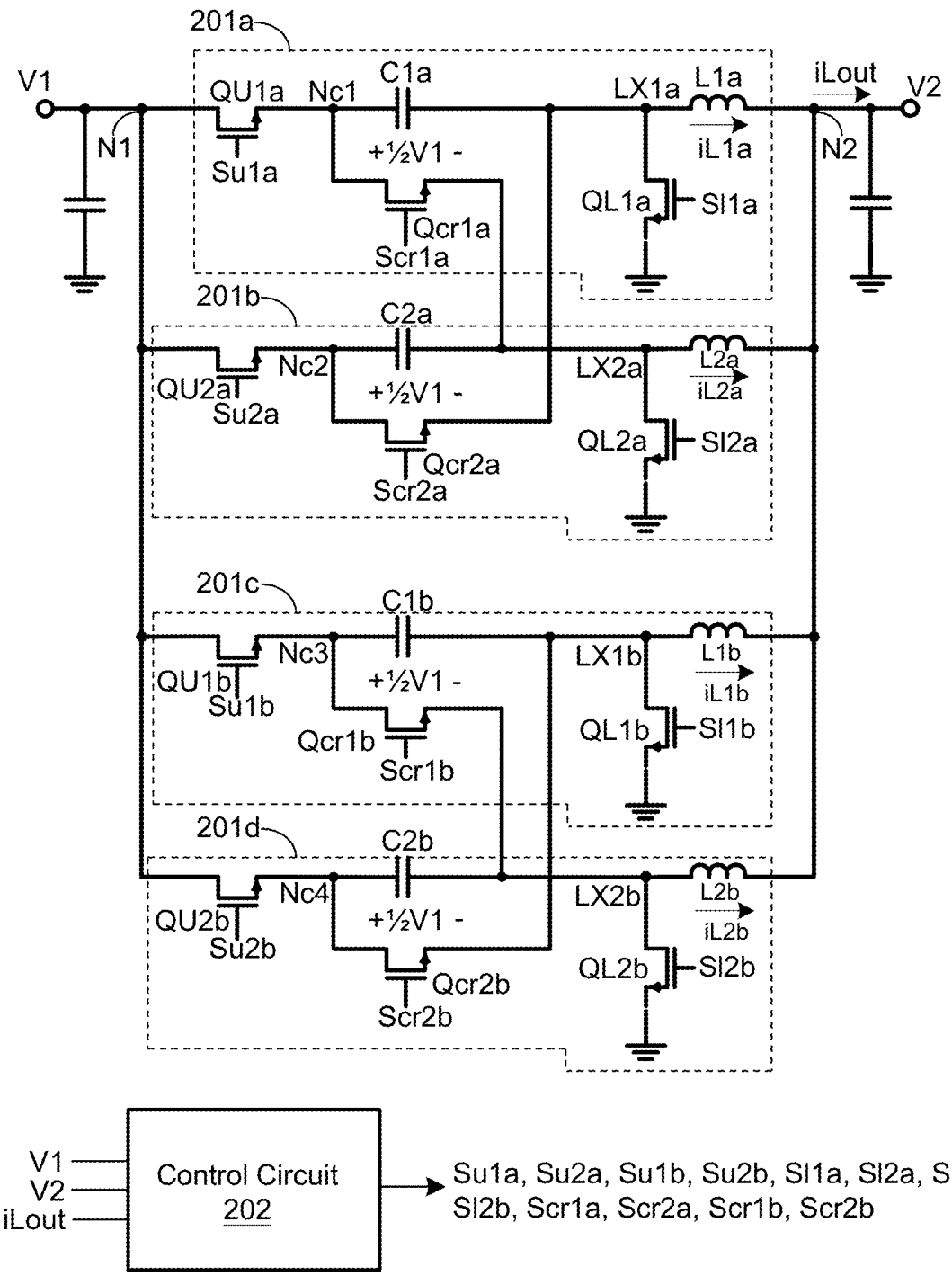
FIG. 6 shows a schematic circuit diagram of a multi-phase switching converter according to still another exemplary embodiment of the present invention.

FIG. 6 shows a schematic circuit diagram of a multi-phase switching converter according to still another exemplary embodiment of the present invention. The multi-phase switching converter 20 of this embodiment shown in FIG. 6 is similar to the multi-phase switching converter 20 of the embodiment shown in FIG. 4, but is different in that: as compared to the multi-phase switching converter 20 of the embodiment shown in FIG. 4, the multi-phase switching converter 20 of this embodiment shown in FIG. 6 is implemented as including four sub-switching converters 201a, 201b, 201c and 201d. In one embodiment, the plural sub-switching converters (i.e., sub-switching converter 201a, sub-switching converter 201b, sub-switching converter 201c and sub-switching converter 201d) are arranged in an annular sequence, and every two of the consecutive sub-switching converters (e.g., sub-switching converter 201a and sub-switching converter 201b as well as sub-switching converter 201c and sub-switching converter 201d; or, sub-switching converter 201b and sub-switching converter 201c as well as sub-switching converter 201d and sub-switching converter 201a) are and periodically switched between the plural electrical connection states, so as to switch each one of the inductor switching nodes (e.g., LX1a and LX2a as well as LX1b and LX2b; or, LX2a and LX1b as well as LX2b and LX1b) between a divided voltage (i.e., ½*V1) equal to ½-fold of the first voltage V1 and the reference potential and to thereby conduct the power conversion between the first voltage V1 and the second voltage V2. It is worthwhile mentioning that, in another embodiment, it is also practicable and within the broadest scope of the present invention that the all plural sub-switching converters (i.e., sub-switching converter 201a, sub-switching converter 201b, sub-switching converter 201c and sub-switching converter 201d, i.e., a number for the sub-switching converters is equal to four) are periodically and consecutively switched between the plurality of the electrical connection states. As a result, in this case, the all plural sub-switching converters (i.e., sub-switching converter 201a, sub-switching converter 201b, sub-switching converter 201c and sub-switching converter 201d) are periodically and consecutively switched between the plural electrical connection states, based upon an annular sequence, so as to correspondingly switch all the inductor switching nodes (i.e., LX1a, LX2a, LX1b and LX2b) of all the sub-switching converters (i.e., sub-switching converter 201a, sub-switching converter 201b, sub-switching converter 201c and sub-switching converter 201d) between a divided voltage (i.e., ¼*V1) equal to ¼-fold of the first voltage V1 and the reference potential and between a divided voltage (i.e., 2/4*V1) equal to 2/4-fold of the first voltage V1 and the reference potential and between a divided voltage (i.e., ¾*V1) equal to ¾-fold of the first voltage V1 and the reference potential, and to thereby execute the power conversion between the first voltage V1 and the second voltage V2. In one embodiment, the control circuit 202 shown in FIG. 6 can be implemented through adopting a configuration of the control circuit 202 shown in FIG. 2A or a configuration of the control circuit 202' shown in FIG. 2B.

Figure 7:
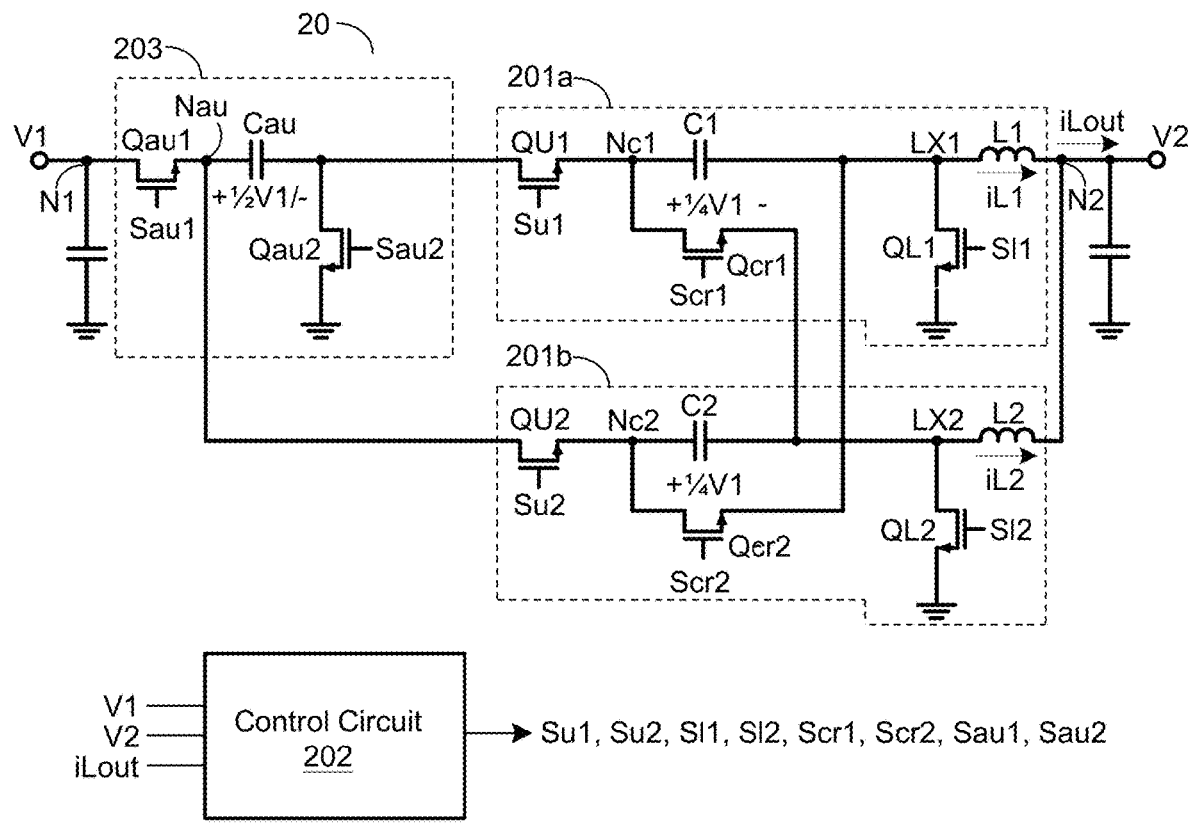
FIG. 7 shows a schematic circuit diagram of a multi-phase switching converter according to still another exemplary embodiment of the present invention.

FIG. 7 shows a schematic circuit diagram of a multi-phase switching converter according to still another exemplary embodiment of the present invention. The multi-phase switching converter 20 of this embodiment shown in FIG. 7 is similar to the multi-phase switching converter 20 of the embodiment shown in FIG. 2A, but is different in that: as compared to the multi-phase switching converter 20 of the embodiment shown in FIG. 2A, the multi-phase switching converter 20 of this embodiment shown in FIG. 7 further includes: an auxiliary switched capacitor circuit 203. The auxiliary switched capacitor circuit 203 is coupled to the one (i.e., sub-switching converter 201a) of the plural sub-switching converters (i.e., sub-switching converter 201a and sub-switching converter 201b) and the auxiliary switched capacitor circuit 203 is coupled to the another one (i.e., sub-switching converter 201b) of the plural sub-switching converters (i.e., sub-switching converter 201a and sub-switching converter 201b). As shown in FIG. 7, the auxiliary switched capacitor circuit 203 includes: an auxiliary capacitor Cau and plural auxiliary switches (e.g., Qau1 and Qau2). In addition to producing switching signals (e.g., Su1, Su2, Sl1, Sl2, Scr1 and Scr2), the control circuit 202 is further configured to operably produce plural auxiliary switching signals (e.g., Sau1 and Sau2), so as to correspondingly control the plural corresponding auxiliary switches (e.g., Qau1 and Qau2) of the auxiliary switched capacitor circuit 203 and the plural corresponding switches (e.g., QU1, QU2, QL1, QL2, Qcr1 and Qcr2) in the one (i.e., sub-switching converter 201a) of as well as the another one (i.e., sub-switching converter 201b) of the plural corresponding sub-switching converters (i.e., sub-switching converter 201a and sub-switching converter 201b), thus periodically switching the auxiliary capacitor Cau and the one (i.e., sub-switching converter 201a) of the plural sub-switching converters (i.e., sub-switching converter 201a and sub-switching converter 201b) and thus switching the auxiliary capacitor and the another one (i.e., sub-switching converter 201b) of the plural sub-switching converters (i.e., sub-switching converter 201a and sub-switching converter 201b) between a first auxiliary electrical connection state and a second auxiliary electrical connection state, and to thereby conduct the switched capacitor switching on the first voltage V1, so that a voltage across the auxiliary capacitor Cau is regulated at an auxiliary divided voltage of the first voltage V1 by conducting an operation of voltage biasing on the auxiliary capacitor Cau. In one embodiment, the control circuit 202 shown in FIG. 7 can be implemented through adopting a configuration of the control circuit 202 shown in FIG. 2A or a configuration of the control circuit 202' shown in FIG. 2B.

Within the first auxiliary electrical connection state, the auxiliary switch Qau2, the high-side switch QU2, the cross-over switch Qcr1 and the low-side switch QL1 are switched to become ON, whereas, the auxiliary switch Qau1, the high-side switch QU1, the cross-over switch Qcr2 and the low-side switch QL2 are switched to become OFF, such that a series connection of the capacitor C1 of the sub-switching converter 201a and the capacitor C2 of the sub-switching converter 201b is connected in parallel between an auxiliary switching node Nau in the auxiliary switched capacitor circuit 203 and the reference potential.

Within the second auxiliary electrical connection state, the auxiliary switch Qau1, the high-side switch QU1, the cross-over switch Qcr2 and the low-side switch QL2 are switched to become ON, whereas, the auxiliary switch Qau2, the high-side switch QU2, the cross-over switch Qcr1 and the low-side switch QL1 are switched to become OFF, such that a series connection of the capacitor C1 of the sub-switching converter 201a and the capacitor C2 of the sub-switching converter 201b is connected in series between the first node and the reference potential.

FIG. 8 illustrates signal waveform diagrams depicting signals associated with the operation of a multi-phase switching converter of FIG. 2A according to an exemplary embodiment of the present invention. The switching signals Su1, Scr1, Sl1, Su2, Scr2 and Sl2, the inductor currents iL1 and iL2, an output inductor current iLout and the switching period Tsw are illustrated in FIG. 8. As shown in FIG. 8, an order of the plural electrical connection states in this embodiment is sequentially arranged as the following: the first electrical connection state S1 (i.e., as shown by an interval ranging from a timing point t0 to a timing point t1 in FIG. 8), the second electrical connection state S2 (i.e., as shown by an interval ranging from the timing point t1 to a timing point t2 in FIG. 8), the third electrical connection state S3 (i.e., as shown by an interval ranging from the timing point t2 to a timing point t3 in FIG. 8) and the second electrical connection state S2 (i.e., as shown by an interval ranging from the timing point t3 to a timing point t4 in FIG. 8).

Figure 9:
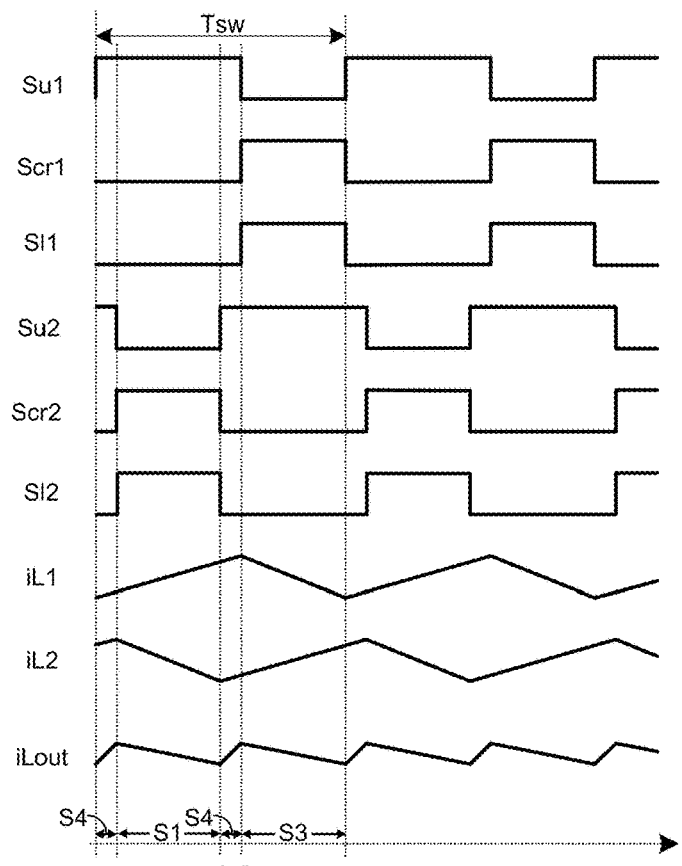
FIG. 9 illustrates signal waveform diagrams depicting signals associated with the operation of a multi-phase switching converter of FIG. 2A according to another exemplary embodiment of the present invention.

FIG. 9 illustrates signal waveform diagrams depicting signals associated with the operation of a multi-phase switching converter of FIG. 2A according to another exemplary embodiment of the present invention. The switching signals Su1, Scr1, Sl1, Su2, Scr2 and Sl2, the inductor currents iL1 and iL2, an output inductor current iLout and the switching period Tsw are illustrated in FIG. 9. As shown in FIG. 9, an order of the plural electrical connection states in this embodiment is sequentially arranged as the following: the fourth electrical connection state S4 (i.e., as shown by an interval ranging from a timing point t0 to a timing point t1 in FIG. 9), the first electrical connection state S1 (i.e., as shown by an interval ranging from the timing point t1 to a timing point t2 in FIG. 9), the fourth electrical connection state S4 (i.e., as shown by an interval ranging from the timing point t2 to a timing point t3 in FIG. 9) and the third electrical connection state S3 (i.e., as shown by an interval ranging from the timing point t3 to a timing point t4 in FIG. 9).

FIG. 10 illustrates signal waveform diagrams depicting signals associated with the operation of a multi-phase switching converter of FIG. 3 according to an exemplary embodiment of the present invention. The switching signals Su1, Scr1, Sl1, Su2, Scr2 and Sl2, the inductor currents iL1 and iL2, an output inductor current iLout, a zero current detection signal ZCD1/ZCD2 and the switching period Tsw are illustrated in FIG. 10. As shown in FIG. 10, an order of the plural electrical connection states in this embodiment is sequentially arranged as the following: the first electrical connection state S1 (i.e., as shown by an interval ranging from a timing point t0 to a timing point t1 in FIG. 10) and the third electrical connection state S3 (i.e., as shown by an interval ranging from a timing point t2 to a timing point t3 in FIG. 10). Please refer to FIG. 10 along with FIG. 3. In a case where the multi-phase switching converter 20 operates in the resonant mode, on one hand, the control circuit 202 is configured to operably produce the zero current detection signals ZCD1 for switching the corresponding switches QU1, QL1 and Qcr1 according to a scenario where the control circuit 202 detects that an inductor current iL1 flowing through the corresponding inductor L1 is a zero current, whereas, on the other hand, the control circuit 202 is configured to operably produce the zero current detection signals ZCD2 for switching the corresponding switches QU2, QL2 and Qcr2 according to a scenario where the control circuit 202 detects that an inductor current iL2 flowing through the corresponding inductor L2 is a zero current.

FIG. 11 illustrates signal waveform diagrams depicting signals associated with the operation of a multi-phase switching converter of FIG. 3 according to another exemplary embodiment of the present invention. The switching signals Su1, Scr1, Sl1, Su2, Scr2 and Sl2, the inductor currents iL1 and iL2, an output inductor current iLout and the switching period Tsw are illustrated in FIG. 11. As shown in FIG. 11, an order of the plural electrical connection states in this embodiment is sequentially arranged as the following: the first electrical connection state S1 (i.e., as shown by an interval ranging from a timing point t0 to a timing point t1 in FIG. 11), the second electrical connection state S2 (i.e., as shown by an interval ranging from the timing point t1 to a timing point t2 in FIG. 11), the third electrical connection state S3 (i.e., as shown by an interval ranging from the timing point t2 to a timing point t3 in FIG. 11) and the second electrical connection state S2 (i.e., as shown by an interval ranging from the timing point t3 to a timing point t4 in FIG. 11).

Figure 12:
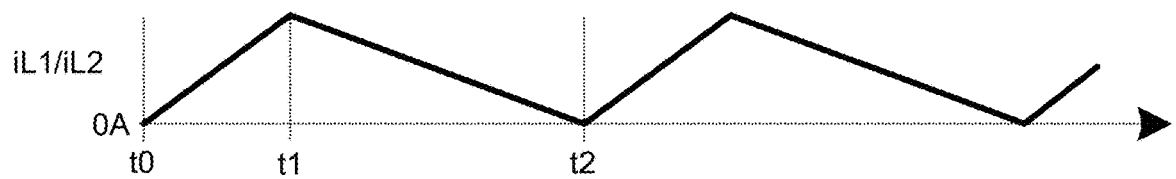
FIG. 12 to FIG. 15 illustrate signal waveform diagrams depicting signals associated with the operation of a multi-phase switching converter of FIG. 2A according to different exemplary embodiments of the present invention.

FIG. 12 to FIG. 15 illustrate signal waveform diagrams depicting signals associated with the operation of a multi-phase switching converter of FIG. 2A according to different exemplary embodiments of the present invention. Please refer to FIG. 12 along with FIG. 2A. In accordance with a load level, the control circuit 202 is configured to operably generate the corresponding switching signals Su1, Su2, Sl1, Sl2, Scr1 and Scr2 for switching the corresponding high-side switch QU1, the corresponding high-side switch QU2, the corresponding low-side switch QL1, the corresponding low-side switch QL2, the corresponding cross-over switch Qcr1 and the corresponding cross-over switch Qcr2, respectively, thereby respectively switching the corresponding electrical connection states. Besides, as a result, in this case, the control circuit 202 is configured to operably render the plural sub-switching converters 201a and 201b to operate in a boundary conduction mode (BCM). As shown in FIG. 12, each corresponding switch is switched at a zero current time point where the inductor current iL1 or iL2 is zero, thus accomplishing a soft switching of a zero current switching (ZCS).

Figure 13:
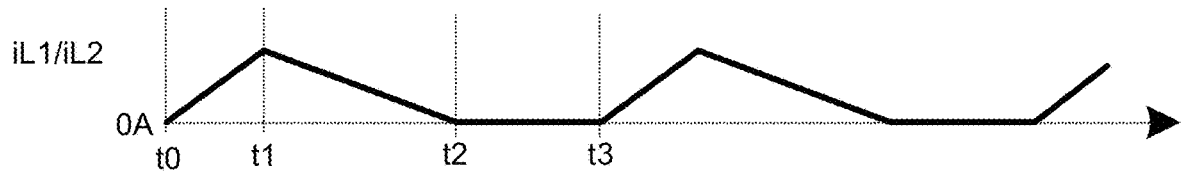
Figure 14:
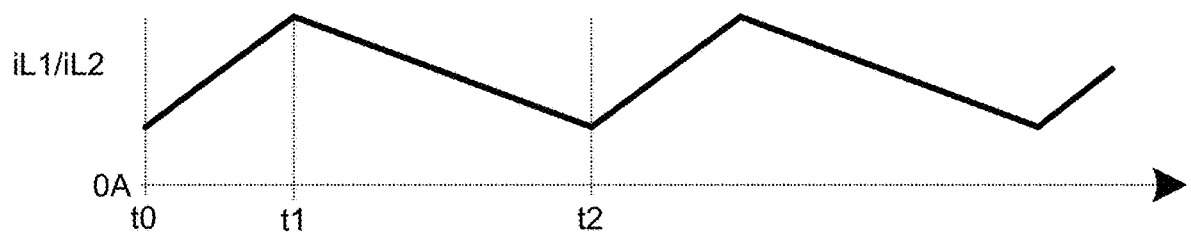
Figure 15:
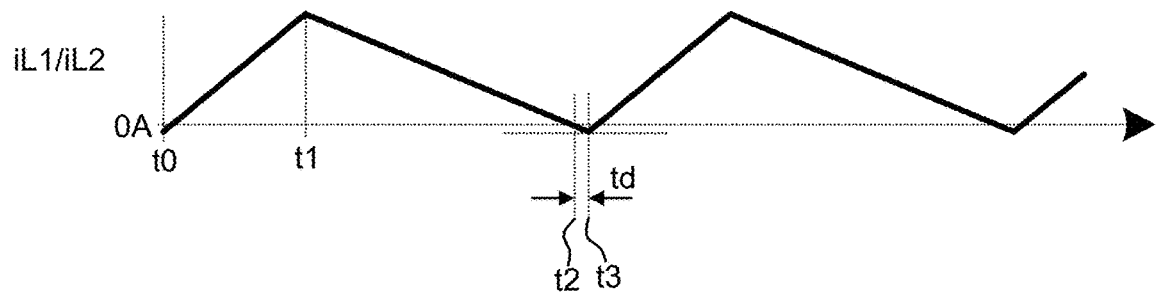

Please refer to FIG. 13 along with FIG. 2A. In accordance with a load level, the control circuit 202 is configured to operably generate the corresponding switching signals Su1, Su2, Sl1, Sl2, Scr1 and Scr2 for switching the corresponding high-side switch QU1, the corresponding high-side switch QU2, the corresponding low-side switch QL1, the corresponding low-side switch QL2, the corresponding crossover switch Qcr1 and the corresponding cross-over switch Qcr2, respectively, thereby respectively switching the corresponding electrical connection states. Besides, as a result, in this case, the control circuit 202 is configured to operably render the plural sub-switching converters 201a and 201b to operate in a discontinuous conduction mode (DCM). Please refer to FIG. 14 along with FIG. 2A. In accordance with a load level, the control circuit 202 is configured to operably generate the corresponding switching signals Su1, Su2, Sl1, Sl2, Scr1 and Scr2 for switching the corresponding high-side switch QU1, the corresponding high-side switch QU2, the corresponding low-side switch QL1, the corresponding low-side switch QL2, the corresponding cross-over switch Qcr1 and the corresponding cross-over switch Qcr2, respectively, thereby respectively switching the corresponding electrical connection states. Besides, as a result, in this case, the control circuit 202 is configured to operably render the plural sub-switching converters 201a and 201b to operate in a continuous conduction mode (CCM).

Figure 16:
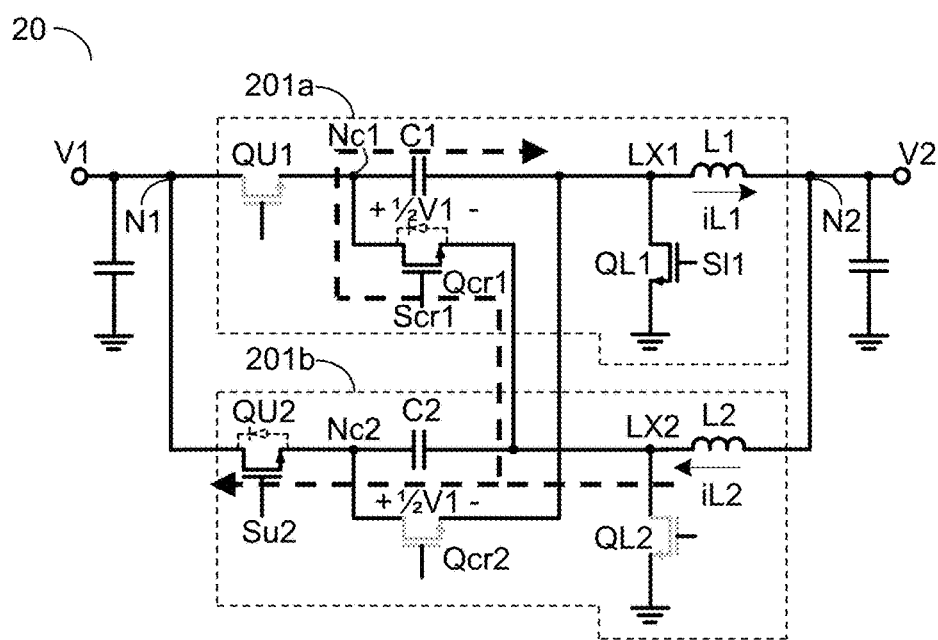
FIG. 16 shows a schematic circuit diagram and a schematic operational diagram of a multi-phase switching converter according to an exemplary embodiment of the present invention.

FIG. 16 shows a schematic circuit diagram and a schematic operational diagram of a multi-phase switching converter according to an exemplary embodiment of the present invention. Please refer to FIG. 15 along with FIG. 16. Subsequent to a scenario where the corresponding inductor L1 or L2 is being demagnetized and subsequent to a case where an inductor current iL1 flowing through the corresponding inductor L1 is a zero current or a case where an inductor current iL2 flowing through the corresponding inductor L2 is a zero current, after waiting for a delay time td, the control circuit 202 is configured to operably switch the corresponding high-side switch QU2, the corresponding cross-over switch Qcr1 and the corresponding low-side switch QL1, thereby switching from the second electrical connection state S2 to the third electrical connection state S3. As shown in FIG. 16, after the multi-phase switching converter 20 of this embodiment has already switched to the third electrical connection state S3, the inductor current iL2 flowing through the corresponding inductor L2 in a reversed direction will flow along a path (illustrated as a thick dashed line in FIG. 16) to the first voltage V1 or the second voltage V2, thereby accomplishing a soft switching of a zero voltage switching (ZVS) through utilizing energy stored in the cross-over switch Qcr1 and the high-side switch QU2 and by actuating a body diode of the cross-over switch Qcr1 as well as a body diode of the high-side switch QU2.

As fully elaborated above, merits and superiorities of the multi-phase switching converter provided by the present invention include: that, the present invention is well capable of accomplishing a relatively greater power conversion efficiency; and that, the present invention is well able to adopt an inductor having a relatively smaller size; and that, the present invention has capacity to produce a relatively lower voltage stress on the components within the multi-phase switching converter.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

The invention claimed is:

1. A multi-phase switching converter, which is configured to execute a power conversion between a first voltage at a first node and a second voltage at a second node; the multi-phase switching converter comprising:
   a plurality of sub-switching converters, at least including a first sub-switching converter and a second sub-switching converter;
   a control circuit, which is configured to generate a plurality of switching signals, so as to correspondingly control a plurality of switches of plurality of sub-switching converters, thus periodically switching the plurality of sub-switching converters between a plurality of electrical connection states and to thereby execute the power conversion between the first voltage at the first node and the second voltage at the second node; and
   an auxiliary switched capacitor circuit, wherein the auxiliary switched capacitor circuit is coupled to the first sub-switching converter of the plurality of sub-switching converters, and wherein the auxiliary switched capacitor circuit is coupled to the second sub-switching converter of the plurality of sub-switching converters, wherein the auxiliary switched capacitor circuit includes:
   an auxiliary capacitor; and
   a plurality of auxiliary switches;
   wherein each of the plurality of sub-switching converters includes: a capacitor, an inductor and at least two of the plurality of switches, wherein in each of the plurality of sub-switching converters the inductor has one end coupled to the second node, whereas, another end of the inductor and the capacitor are coupled to an inductor switching node in each of the plurality of sub-switching converters;
   wherein between the plurality of electrical connection states, the plurality of switching signals operate the capacitor of the first sub-switching converter of the plurality of sub-switching converters and the capacitor of the second sub-switching converter of the plurality of sub-switching converters, so as to conduct a switched capacitor switching on the first voltage, thus switching the inductor switching node in each of the plurality of sub-switching converters between a divided voltage of the first voltage and a reference potential and to thereby execute the power conversion between the first voltage and the second voltage;

wherein when the inductors of each of the plurality of sub-switching converters are coupled with one another in a non-electromagnetic fashion, the multi-phase switching converter operates in a non-resonant mode;

wherein when the inductors of at least two of the plurality of sub-switching converters are electromagnetically coupled with one another, the multi-phase switching converter operates in a resonant mode or in the non-resonant mode;

wherein the at least two of the plurality of switches in the first sub-switching converter of the plurality of sub-switching converters include:
  a high-side switch, which is coupled between the first node and the capacitor of the sub-switching converter therein;
  a low-side switch, which is coupled between the inductor switching node of the sub-switching converter therein and the reference potential; and
  a cross-over switch, which is coupled between a capacitor switching node and the inductor switching node in the second sub-switching converter of the plurality of sub-switching converters, wherein the capacitor switching node lies between the high-side switch of the first sub-switching converter and the capacitor of the first sub-switching converter;

wherein the control circuit is further configured to generate a plurality of auxiliary switching signals, so as to correspondingly control the plurality of auxiliary switches of the auxiliary switched capacitor circuit and the plurality of switches in the first sub-switching converter and the second sub-switching converter of the plurality of sub-switching converters, thus periodically switching the auxiliary capacitor and the first sub-switching converter of the plurality of sub-switching converters and thus switching the auxiliary capacitor and the second sub-switching converter of the plurality of sub-switching converters between a first auxiliary electrical connection state and a second auxiliary electrical connection state, and to thereby conduct the switched capacitor switching on the first voltage, so that a voltage across the auxiliary capacitor is regulated at an auxiliary divided voltage of the first voltage by conducting an operation of voltage biasing on the auxiliary capacitor;

wherein the first auxiliary electrical connection state includes: a series connection of the capacitor of the first sub-switching converter of the plurality of sub-switching converters and the capacitor of the second sub-switching converter of the plurality of sub-switching converters being connected in parallel between an auxiliary switching node in the auxiliary switched capacitor circuit and the reference potential;

wherein the second auxiliary electrical connection state includes: a series connection of the capacitor of the first sub-switching converter of the plurality of sub-switching converters and the capacitor of the second sub-switching converter of the plurality of sub-switching converters being connected in series between the first node and the reference potential;

wherein subsequent to a zero current time point when a zero current detection signal indicates that an inductor current flowing through one of the inductors is a zero current, the control circuit is further configured to generate the plurality of switching signals for switching the plurality of switches, thereby switching the electrical connection state;

wherein subsequent to the zero current time point, after waiting for a dead-time, the control circuit is configured to generate the plurality of switching signals for switching the plurality of switches, thereby switching the electrical connection state; and wherein the plurality of switches accomplishes a soft switching of a zero current switching (ZCS) or a soft switching of a zero voltage switching (ZVS).

2. The multi-phase switching converter as claimed in claim 1, wherein a non-zero phase difference lies between at least two inductor currents of at least two inductors of the inductors of the plurality of sub-switching converters.

3. The multi-phase switching converter as claimed in claim 1, wherein a minimum of a number of the divided voltage is equal to one, whereas, a maximum of the number of the divided voltage is equal to a number of the plurality of sub-switching converters minus one.

4. The multi-phase switching converter as claimed in claim 1, wherein the plurality of sub-switching converters are arranged in an annular sequence, and every two of consecutive sub-switching converters of the plurality of sub-switching converters are periodically switched between the plurality of electrical connection states, so as to switch each of the inductor switching nodes between a divided voltage equal to ½-fold of the first voltage and the reference potential and to thereby conduct the power conversion between the first voltage and the second voltage.

5. The multi-phase switching converter as claimed in claim 1, wherein a number of the plurality of sub-switching converters is equal to N, wherein all of the plurality of sub-switching converters are periodically and consecutively switched between the plurality of electrical connection states based on an annular sequence, so as to correspondingly switch all the inductor switching nodes of all of the plurality of sub-switching converters between a divided voltage equal to 1/N-fold of the first voltage and the reference potential, between a divided voltage equal to 2/N-fold of the first voltage and the reference potential, and so on to, between a divided voltage equal to N−1/N-fold of the first voltage and the reference potential, and to thereby execute the power conversion between the first voltage and the second voltage, wherein N denotes a positive integer greater than two.

6. The multi-phase switching converter as claimed in claim 1, wherein based on the first voltage, the second voltage and a load level, the control circuit is configured to generate the plurality of switching signals for switching the plurality of switches, thereby switching the electrical connection state to magnetize the inductors within a constant ON time.

7. The multi-phase switching converter as claimed in claim 1, wherein based on a load level, the control circuit is configured to generate the plurality of switching signals for switching the plurality of switches, thereby switching the electrical connection state, and wherein the control circuit is configured to control the plurality of sub-switching converters to operate in a boundary conduction mode (BCM), a continuous conduction mode (CCM) or a discontinuous conduction mode (DCM).

8. The multi-phase switching converter as claimed in claim 1, wherein subsequent to when the inductor is being demagnetized and subsequent to when the inductor current flowing through the one of the inductors is the zero current, after waiting for a delay time, the control circuit is configured to switch the plurality of switches, thereby switching the electrical connection state.

9. The multi-phase switching converter as claimed in claim 1, wherein the control circuit includes:
a zero current detection circuit configured to generate the zero current detection signal.

10. The multi-phase switching converter as claimed in claim 1, wherein when the multi-phase switching converter operates in the resonant mode, the control circuit generates the zero current detection signal for switching the plurality of switches according to a time at which the control circuit detects that the inductor current flowing through the one of the inductors is the zero current.

11. A control method of a multi-phase switching converter; the control method comprising following steps:
generating a plurality of switching signals, so as to correspondingly control a plurality of switches of a plurality of sub-switching converters in the multi-phase switching converter, thus periodically switching the plurality of sub-switching converters between a plurality of electrical connection states and to thereby execute a power conversion between a first voltage at a first node and a second voltage at a second node, wherein each of the plurality of sub-switching converters includes: a capacitor, an inductor and at least two the plurality of switches, wherein in each of the plurality of sub-switching converters the inductor has one end coupled to the second node, whereas, another end of the inductor and the capacitor are coupled to an inductor switching node in each of the plurality of sub-switching converters, wherein the plurality of sub-switching converters at least includes a first sub-switching converter and a second sub-switching converter;
between the plurality of electrical connection states, operating the capacitor of the first sub-switching converter of the plurality of sub-switching converters and the capacitor of the second sub-switching converter of the plurality of sub-switching converters via the plurality of the switching signals, so as to conduct a switched capacitor switching on the first voltage, thus switching the inductor switching node in each of the plurality of sub-switching converters between a divided voltage of the first voltage and a reference potential and to thereby execute the power conversion between the first voltage and the second voltage;
generating a plurality of auxiliary switching signals, so as to correspondingly control a plurality of auxiliary switches of an auxiliary switched capacitor circuit and the plurality of switches in the first sub-switching converter and the second sub-switching converter of the plurality of sub-switching converters, thus periodically switching an auxiliary capacitor and the first sub-switching converter of the plurality of sub-switching converters and thus switching the auxiliary capacitor and the second sub-switching converter of the plurality of sub-switching converters between a first auxiliary electrical connection state and a second auxiliary electrical connection state, and to thereby conduct the switched capacitor switching on the first voltage, so that a voltage across the auxiliary capacitor is regulated at an auxiliary divided voltage of the first voltage by conducting an operation of voltage biasing on the auxiliary capacitor, wherein the auxiliary switched capacitor circuit is coupled to the first sub-switching converter of the plurality of sub-switching converters, and wherein the auxiliary switched capacitor circuit is coupled to the second sub-switching converter of the plurality of sub-switching converters;
subsequent to a zero current time point when a zero current detection signal indicates that an inductor current flowing through one of the inductors is a zero current, switching the plurality of switches via the plurality of switching signals, thereby switching the electrical connection state; and
subsequent to the zero current time point, after waiting for a dead-time, switching the plurality of switches by the plurality of switching signals, thereby switching the electrical connection state;
wherein when the inductors of each of the plurality of sub-switching converters are coupled with one another in a non-electromagnetic fashion, the multi-phase switching converter operates in a non-resonant mode;
wherein when the inductors of at least two of the plurality of sub-switching converters are electromagnetically coupled with one another, the multi-phase switching converter operates in a resonant mode or in the non-resonant mode;
wherein the at least two of the plurality of switches in the first sub-switching converter of the plurality of sub-switching converters include: a high-side switch, a low-side switch and a cross-over switch, wherein the high-side switch is coupled between the first node and the capacitor of the sub-switching converter therein; wherein the low-side switch is coupled between the inductor switching node of the sub-switching converter therein and the reference potential; wherein the cross-over switch is coupled between a capacitor switching node and the inductor switching node in the second sub-switching converter of the plurality of sub-switching converters, wherein the capacitor switching node lies between the high-side switch of the first sub-switching converter and the capacitor of the first sub-switching converter;
wherein the first auxiliary electrical connection state includes: a series connection of the capacitor of the first sub-switching converter of the plurality of sub-switching converters and the capacitor of the second sub-switching converter of the plurality of sub-switching converters being connected in parallel between an auxiliary switching node in the auxiliary switched capacitor circuit and the reference potential;
wherein the second auxiliary electrical connection state includes: a series connection of the capacitor of the first sub-switching converter of the plurality of sub-switching converters and the capacitor of the second sub-switching converter of the plurality of sub-switching converters being connected in series between the first node and the reference potential; and
wherein the plurality of switches accomplishes a soft switching of a zero current switching (ZCS) or a soft switching of a zero voltage switching (ZVS).

12. The control method as claimed in claim 11, wherein a non-zero phase difference lies between at least two inductor currents of at least two inductors of the inductors of the plurality of sub-switching converters.

13. The control method as claimed in claim 11, wherein a minimum of a number of the divided voltage is equal to one, whereas, a maximum of the number of the divided voltage is equal to a number of the plurality of sub-switching converters minus one.

14. The control method as claimed in claim 11, further comprising following steps:

periodically switching every two of consecutive sub-switching converters of the plurality of sub-switching converters arranged in an annular sequence between the plurality of electrical connection states by the plurality of switching signals, so as to switch each of the inductor switching nodes between a divided voltage equal to ½-fold of the first voltage and the reference potential and to thereby conduct the power conversion between the first voltage and the second voltage.

15. The control method as claimed in claim 11, wherein a number of the plurality of sub-switching converters is equal to N, the control method further comprises following steps:

periodically and consecutively switching all of the plurality of sub-switching converters based on an annular sequence by the plurality of switching signals between the plurality of electrical connection states, so as to correspondingly switch all the inductor switching nodes of all of the plurality of sub-switching converters between a divided voltage equal to 1/N-fold of the first voltage and the reference potential, between a divided voltage equal to 2/N-fold of the first voltage and the reference potential, and so on to, between a divided voltage equal to N−1/N-fold of the first voltage and the reference potential, and to thereby execute the power conversion between the first voltage and the second voltage, wherein N denotes a positive integer greater than two.

16. The control method as claimed in claim 11, wherein based on the first voltage, the second voltage and a load level, generating the plurality of switching signals for switching the plurality of switches, thereby switching the electrical connection state; and magnetizing the inductors within a constant ON time.

17. The control method as claimed in claim 11, wherein based on a load level, generating the plurality of switching signals for switching the plurality of switches, thereby switching the electrical connection state; and controlling the plurality of sub-switching converters to operate in a boundary conduction mode (BCM), a continuous conduction mode (CCM) or a discontinuous conduction mode (DCM).

18. The control method as claimed in claim 11, further comprising following steps:

subsequent to when the inductor is being demagnetized and subsequent to when the inductor current flowing through the one of the inductors is the zero current, after waiting for a delay time, switching the plurality of switches, thereby switching the electrical connection state.

19. The control method as claimed in claim 11, further comprising following steps:

generating the zero current detection signal by a zero current detection circuit.

20. The control method as claimed in claim 11, further comprising following steps:

when the multi-phase switching converter operates in the resonant mode, generating the zero current detection signal for switching the plurality of switches according to a time at which the inductor current flowing through the one of the inductors is the zero current.

* * * * *